(12) United States Patent
Hung et al.

(10) Patent No.: US 12,019,255 B2
(45) Date of Patent: Jun. 25, 2024

(54) ANGLED INTERFERENCE FILTERS GENERATING OFFSET RIPPLE EFFECTS

(71) Applicant: OTO PHOTONICS INC., Hsinchu (TW)

(72) Inventors: Chien-Hsiang Hung, Hsinchu (TW); Sheng Wang Lin, Hsinchu (TW)

(73) Assignee: OTO PHOTONICS INC., Hsinchu (TW)

( * ) Notice: Subject to any disclaimer, the term of this patent is extended or adjusted under 35 U.S.C. 154(b) by 375 days.

(21) Appl. No.: 17/202,297

(22) Filed: Mar. 15, 2021

(65) Prior Publication Data

US 2021/0199867 A1 Jul. 1, 2021

Related U.S. Application Data

(63) Continuation of application No. 15/871,959, filed on Jan. 15, 2018, now abandoned.

(30) Foreign Application Priority Data

Mar. 9, 2017 (TW) .................................. 106107793

(51) Int. Cl.
*G01J 3/26* (2006.01)
*G02B 1/115* (2015.01)
*G02B 5/28* (2006.01)

(52) U.S. Cl.
CPC ................. *G02B 5/285* (2013.01); *G01J 3/26* (2013.01); *G02B 1/115* (2013.01)

(58) Field of Classification Search
CPC ..... G02B 1/115; G02B 5/28–289; G01J 3/26; G01J 2003/262; G01J 2003/265; G01J 2003/267

USPC .................................................. 359/580–590
See application file for complete search history.

(56) References Cited

U.S. PATENT DOCUMENTS

| | | | |
|---|---|---|---|
| 4,502,762 A * | 3/1985 | Anderson | B23K 26/035 369/44.37 |
| 9,595,554 B2 * | 3/2017 | Siess | G01J 1/0477 |
| 2003/0190126 A1 * | 10/2003 | Toyoshima | G02B 6/29367 385/27 |
| 2009/0002830 A1 * | 1/2009 | Okamoto | G02B 5/285 359/589 |
| 2010/0046076 A1 * | 2/2010 | Feke | G02B 26/023 356/453 |
| 2017/0160451 A1 * | 6/2017 | Seko | G02B 5/285 |

FOREIGN PATENT DOCUMENTS

CN 106662738 A 5/2017

* cited by examiner

*Primary Examiner* — Ryan S Dunning
(74) *Attorney, Agent, or Firm* — Cheng-Ju Chiang

(57) ABSTRACT

An optical filtering assembly comprises a first interference film and a second interference film. The first interference film comprises multiple first film layers and multiple second film layers. The first film layers and the second film layers are alternately stacked. The second interference film comprises multiple third film layers and multiple fourth film layers. The third film layers and the fourth film layers are alternately stacked. An optical constant of the first film layers is same as an optical constant of the third film layers, and an optical constant of the second film layers is same as an optical constant of the fourth film layers, and an Optical Path Difference (OPD) produced in the first interference film is different from an OPD produced in the second interference film.

20 Claims, 15 Drawing Sheets

ANGLED INTERFERENCE FILTERS GENERATING OFFSET RIPPLE EFFECTS

CROSS-REFERENCE TO RELATED APPLICATION

The present application is a continuation application of U.S. patent application Ser. No. 15/871,959, filed Jan. 15, 2018, which claims benefit of Taiwan Application No. 106107793, filed on Mar. 9, 2017, the disclosure of which is hereby incorporated by reference herein in its entirety.

BACKGROUND OF THE INVENTION

1. Field of the Invention

The present invention is related to a light source device and an optical filtering assembly thereof, and in particular to an optical filtering assembly used for filtering light by means of interference and a light source device in use of the optical filtering assembly.

2. The Related Arts

With the development in modern optics, a kind of interference filter has now been available. In general, the interference filter has a multilayer film in which two kinds of films having different optical constants are alternately stacked. The both kind of films are transparent in appearance. Depending upon thickness distributions and optical constants of the both kind of films, a ray carries out constructive interference and destructive interference while passing through the multilayer film, so that the interference filter allows a ray of a certain wavelength range to pass, and simultaneously blocks out a ray outside the certain wavelength range. However, the design limit of the multilayer film and the manufacturing tolerance of the film thickness have negative influences on the filtering effect. In particular, when the interference filter is applied to optical measuring instruments such as spectrometers, monochromators or interferometers, the measurement precision and accuracy may be reduced.

SUMMARY OF THE INVENTION

An object of the present invention is to provide an optical filtering assembly which utilizes different optical path differences (OPDs) cooperatively produced by two interference films, to improve the filtering effect.

An object of the present invention is further to provide a light source device. The light source device comprises the above mentioned optical filtering assembly.

An optical filtering assembly comprises a first interference film and a second interference film. The first interference film comprises a plurality of first film layers and a plurality of second film layers. The plurality of first film layers and the plurality of second film layers are alternately stacked. The second interference film comprises plurality of third film layers and a plurality of fourth film layers. The plurality of third film layers and the plurality of fourth film layers are alternately stacked. An optical constant of the first film layers is same as an optical constant of the third film layers, and an optical constant of the second film layers is same as an optical constant of the fourth film layers. The first interference film and the second interference film are arranged on a transmission path of a light beam, and an Optical Path Difference (OPD) produced in the first interference film is different from an OPD produced in the second interference film.

The light source device comprises the above optical filtering assembly and a light source, wherein the light source is arranged near the optical filtering assembly and is used to launch a light beam toward the optical filtering assembly.

Accordingly, the optical filtering assembly of the present invention utilizes multiple layers of interference films whose thickness is taken as constants to produce different OPDs and interferences, thus to improve the light filtering effect, that is helpful to the improvement of the precision and accuracy of optical measuring instruments.

In order to further understand features and technology of the present invention, please refer to detailed descriptions and attached drawings presented as below. However, such descriptions and drawings are simply adopted to introduce features and technology of the present invention, and are not used to limit a claimed scope of the present invention.

DETAILED DESCRIPTION OF PREFERRED EMBODIMENT

Figure 1A:
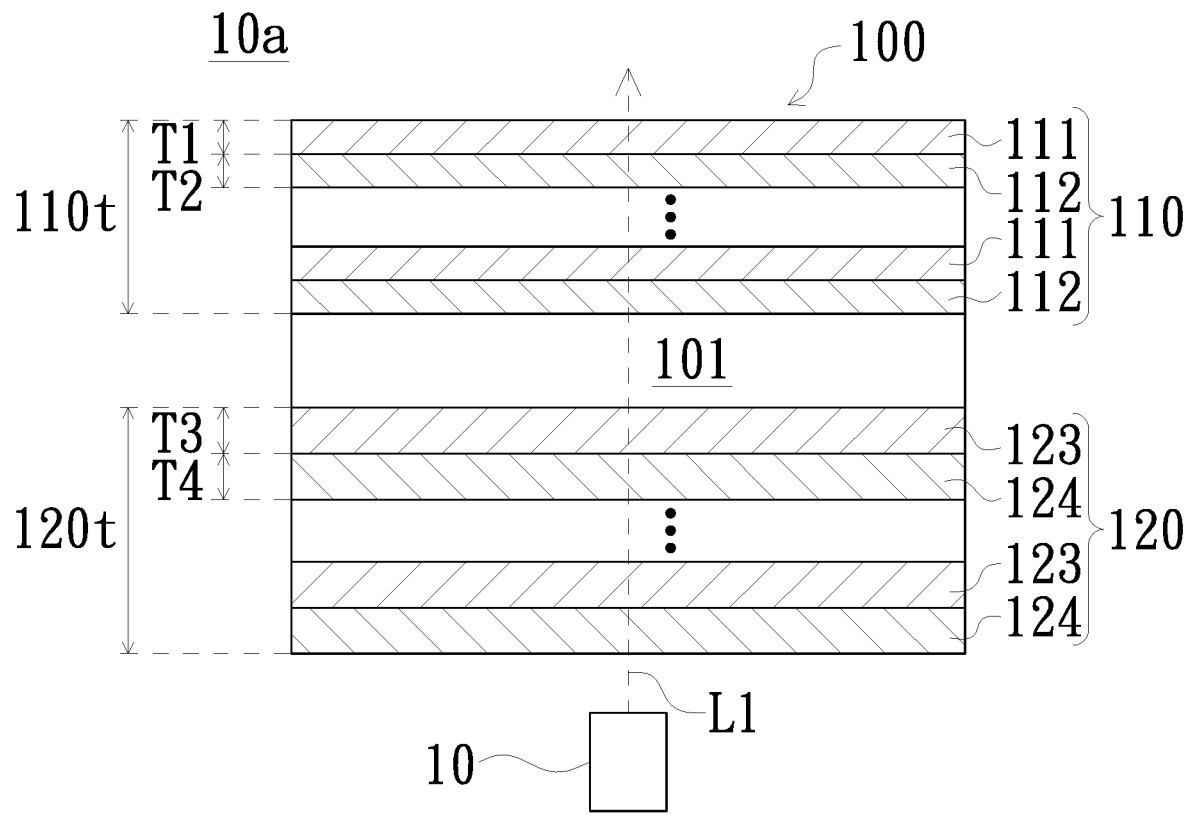
FIG. 1A is a schematic cross-sectional view of a light source device in accordance with an embodiment of the present invention.

FIG. 1A is a schematic cross-sectional view of a light source device 10a in accordance with an embodiment of the present invention. With reference to FIG. 1A, the light source device 10a comprises an optical filtering assembly 100 and a light source 10. The light source 10 is disposed beside the optical filtering assembly 100 and is used to emit a light beam L1 toward the optical filtering assembly 100. The light beam L1 comprises a plurality of rays. The light source 10 may be, for example, a Light Emitting Diode (LED) or a halogen lamp. The optical filtering assembly 100 is disposed in a transmission path of the light beam L1, and comprises two layers of interference films. The two layers of interference films can be manufactured by existing optical film designs. Such optical film designs are publicly disclosed in some existing documents, such as a book titled "Thin Film Optics and Film Coating Technology" (ISBN: 9789863940142) authored by Mr. Cheng-Chung Lee.

In the embodiment shown in FIG. 1A, the optical filtering assembly 100 comprises a first interference film 110 and a second interference film 120. Both of the first interference film 110 and the second interference film 120 are multilayer films. Taking FIG. 1A as an example, the first interference film 110 comprises a plurality of first film layers 111 and a plurality of second film layers 112. Each of the plurality of first film layers 111 has a thickness T1, and each of the plurality of second film layers 112 has a thickness T2. The second interference film 120 comprises a plurality of third film layers 123 and a plurality of fourth film layers 124. Each of the plurality of third film layers 123 has a thickness T3, and each of the plurality of fourth film layers 124 has a thickness T4. The plurality of first film layers 111 and the plurality of second film layers 112 are alternately stacked, and the plurality of third film layers 123 and the plurality of fourth film layers 124 are alternately stacked.

The plurality of first film layers 111 and the plurality of third film layers 123 may be made of high refractive index material, such as tantalum pentoxide or titanium dioxide. The plurality of second film layers 112 and the plurality of fourth film layers 124 may be made of low refractive index material, such as silicon dioxide. Therefore, each of the first interference film 110 and the second interference film 120 is formed by at least two kinds of alternately stacked film layers having different optical constants. The optical constant may be, for example, a refractive index. In addition, the plurality of first film layers 111 and the plurality of third film layers 123 may be made of a same material, and the plurality of second film layers 112 and the plurality of fourth film layers 124 may be made of another same material. However, the material of the plurality of first film layers 111 and the plurality of third film layers 123 is different from the material of the plurality of second film layers 112 and the plurality of fourth film layers 124. As a result, an optical constant of the plurality of first film layers 111 is same as an optical constant of the plurality of third film layers 123, and an optical constant of the plurality of second film layers 112 is same as an optical constant of the plurality of fourth film layers 124. However, the optical constants of the plurality of first film layers 111 and the plurality of third film layers 123 are different from the optical constants of the plurality of second film layers 112 and the plurality of fourth film layers 124.

The first interference film 110 and the second interference film 120 are both disposed in the transmission path of the light beam L1 and are penetrated by the light beam L1. As shown in FIG. 1A, the light beam L1 firstly penetrates through the second interference film 120, and then penetrates through the first interference film 110. When the light beam L1 enters the first interference film 110 and the second interference film 120, the light beam L1 is reflected and refracted at a boundary between every two film layers of the first interference film 110 (i.e., between either one of the plurality of first film layers 111 and a corresponding one of the plurality of second film layers 112), and a boundary between every two film layers of the second interference film 120 (i.e., between either one of the plurality of third film layers 123 and a corresponding one of the plurality of fourth film layers 124) in order to generate light interference. As a result, in the light beam L1, a part of the plurality of light rays with a characteristic wavelength is enhanced due to constructive interference while another part of the plurality of light rays without the characteristic wavelength is eliminated due to destructive interference. Hence, a function of light filtering is achieved.

It is noted that although it is described for the above embodiment that the plurality of first film layers 111 and the plurality of third film layers 123 are layers of high refractive index, and the plurality of second film layers 112 and the plurality of fourth film layers 124 are layers of low refractive index as an example, it is quite clear that in an alternative embodiment, the plurality of first film layers 111 and the plurality of third film layers 123 may be layers of low refractive index, and the plurality of second film layers 112 and the plurality of fourth film layers 124 may be layers of high refractive index. Therefore, the plurality of first film layers 111 and the plurality of third film layers 123 are not limited to be layers of high refractive index as depicted above, and the plurality of second film layers 112 and the plurality of fourth film layers 124 are not limited to be layers of low refractive index as depicted above.

In the embodiment shown in FIG. 1A, the light beam L1 penetrates sequentially through the second interference film 120, a first transparent substrate 101 and the first interference film 110. In another alternative embodiment, the light beam L1 may penetrate sequentially through the first interference film 110, the first transparent substrate 101 and the second interference film 120. When travelling inside the first interference film 110, the light beam L1 penetrates sequentially through the first film layer 111, the second film layer 112, the first film layer 111, the second film layer 112, . . . , and so on, or through the second film layer 112, the first film layer 111, the second film layer 112, the first film layer 111, . . . , and so on. When travelling inside the second interference film 120, the light beam L1 penetrates sequentially through the third film layer 123, the fourth film layer 124, the third film layer 123, the fourth film layer 124, . . . , and so on, or through the fourth film layer 124, the third film layer 123, the fourth film layer 124, the third film layer 123, . . . , and so on. Therefore, penetration sequence(s) of the light beam L1 through the first film layer 111 to the fourth film layer 124 is not limited to the above depicted embodiment as shown in FIG. 1A.

Figure 2A:
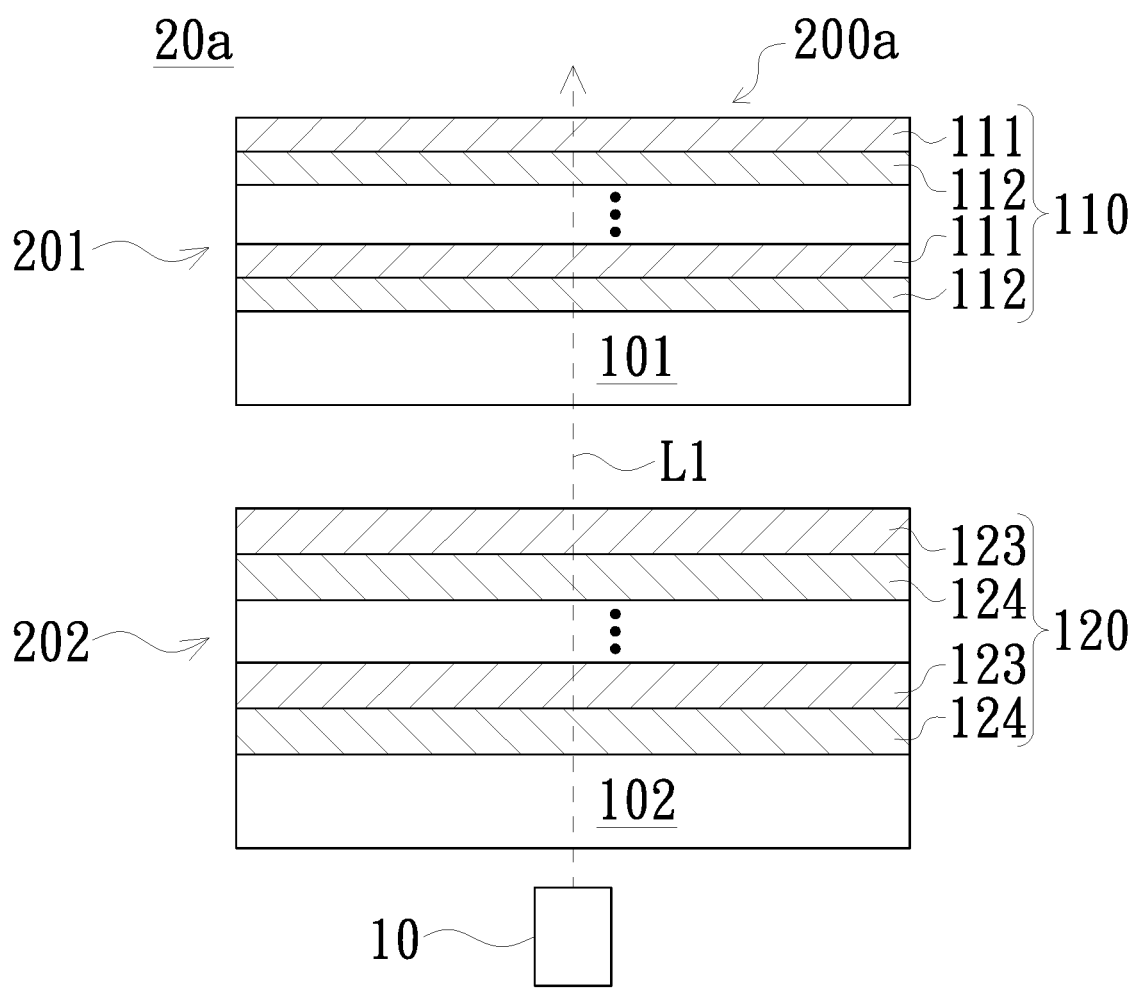
FIG. 2A is a schematic cross-sectional view of a light source device in accordance with another embodiment of the present invention.
Figure 2B:
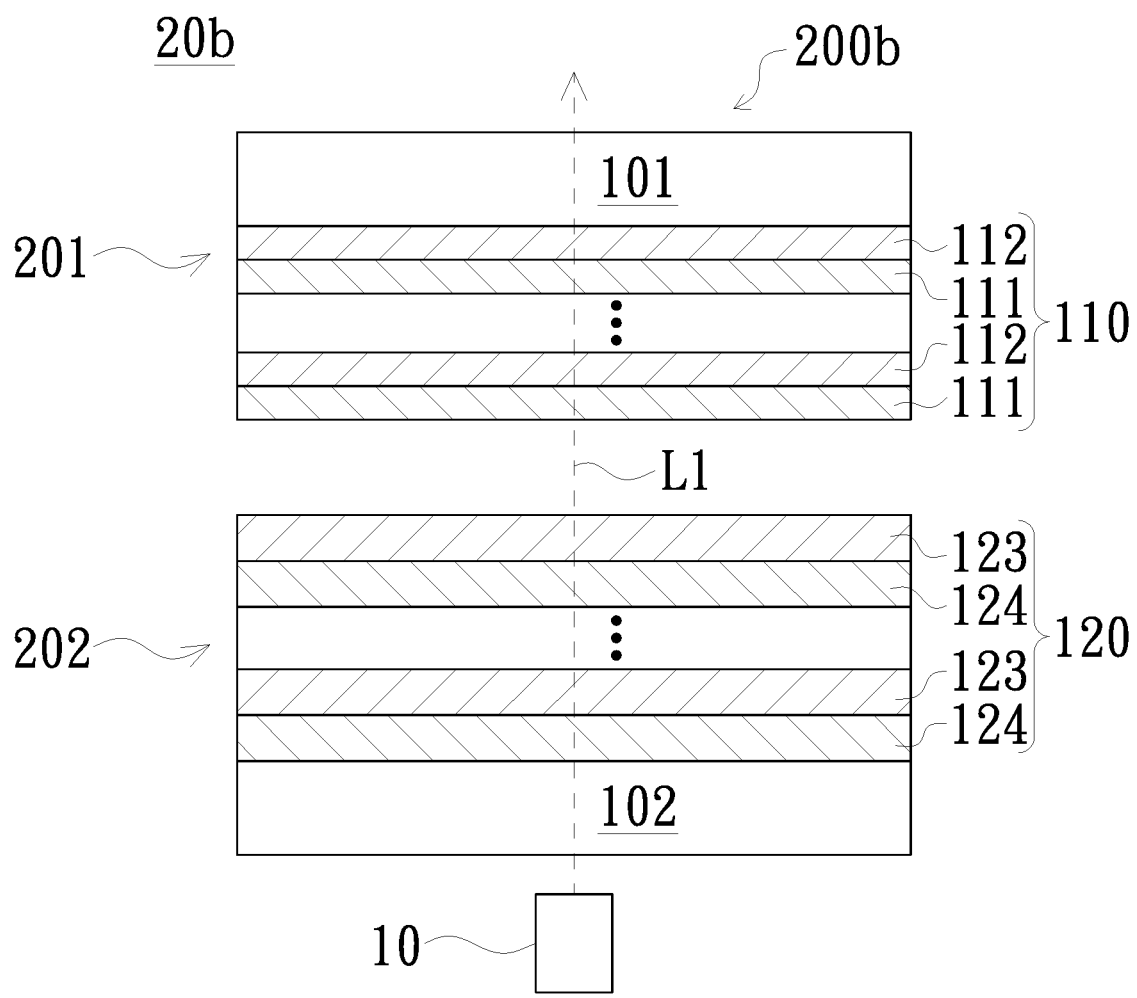
FIG. 2B is a schematic cross-sectional view of a light source device in accordance with further another embodiment of the present invention.

Furthermore, in another embodiment shown in FIG. 2A, the second interference film 120 is disposed between the first transparent substrate 101 and a second transparent substrate 102, and the first transparent substrate 101 is disposed between the first interference film 110 and the second interference film 120. However, in another embodiment, such as further another embodiment shown in FIG. 2B, an optical filtering assembly 200b of a light source device 20b is illustrated that the first interference film 110 and the second interference film 120 are both disposed between the first transparent substrate 101 and second transparent substrate 102. As a result, the light beam L1 enters the second interference film 120 from the second transparent substrate 102, enters the first interference film 110 from the second interference film 120, enters the first transparent substrate 101 from the first interference film 110, and then leaves the optical filtering assembly 200b from the first transparent substrate 101, as shown in FIG. 2B.

In this embodiment, a thickness ratio between each of the plurality of first film layers 111 and either one of the plurality of second film layer 112 adjacent thereto is same as a thickness ratio between each of the plurality of third film layers 123 and either one of the plurality of fourth film layer 124 adjacent thereto. For example, a ratio between a thickness T1 of each first film layer 111 and a thickness T2 of each second film layer 112 alternately stacked with the plurality of first film layers 111 in the first interference film 110 is same as a ratio between a thickness T3 of each third film layer 123 and a thickness T4 of each fourth film layer 124 alternately stacked with the plurality of third film layer 123 in the second interference film 120. For another example, for every four adjacent film layers in the first interference film 110, a thickness ratio of the first film layer 111, the second film layer 112, the first film layer 111 and the second film layer 112 therein is 1:2:3:6, and for every four adjacent film layers in the second interference film 120, a thickness ratio of the third film layer 123, the fourth film layer 124, the third film layer 123 and the fourth film layer 124 therein is 1:2:3:6. In addition, a thickness 110t of the first interference film 110 may not be same as a thickness 120t of the second interference film 120. Among them, the thickness T1 may not be same as the thickness T3, and the thickness T2 may not be same as the thickness T4.

It can be understood that both of the first interference film 110 and the second interference film 120 have a same film layer distribution, and an optical path length (OPL) of the light beam L1 in the first interference film 110 is different from an OPL of the light beam L1 in the second interference film 120. In other words, an optical path difference (OPD) of the light beam L1 generated by travelling in the first interference film 110 is different from an OPD of the light beam L1 generated by travelling in the second interference film 120. Therefore, both of the first interference film 110 and the second interference film 120 can change a phase of a part of light rays in the light beam L1. A phase shift of the light beam L1 caused by the first interference film 110 is different from a phase shift of the light beam L1 caused by the second interference film 120. In other words, interference of the light beam L1 in the first interference film 110 and interference of the light beam L1 in the second interference film 120 (including constructive interference and destructive interference) are different from each other.

In general, an existing interference filter piece often generates ripples. Ripples does not only affect a filtering effect of the interference filter piece, but also reduce accuracy and precision of related optical measuring instruments. In details, when the existing interference filter piece filters a light beam, a spectrum of the filtered light beam shows as wavy curves as shown in FIG. 1B, and the wavy curves are so-called ripples.

Figure 1B:
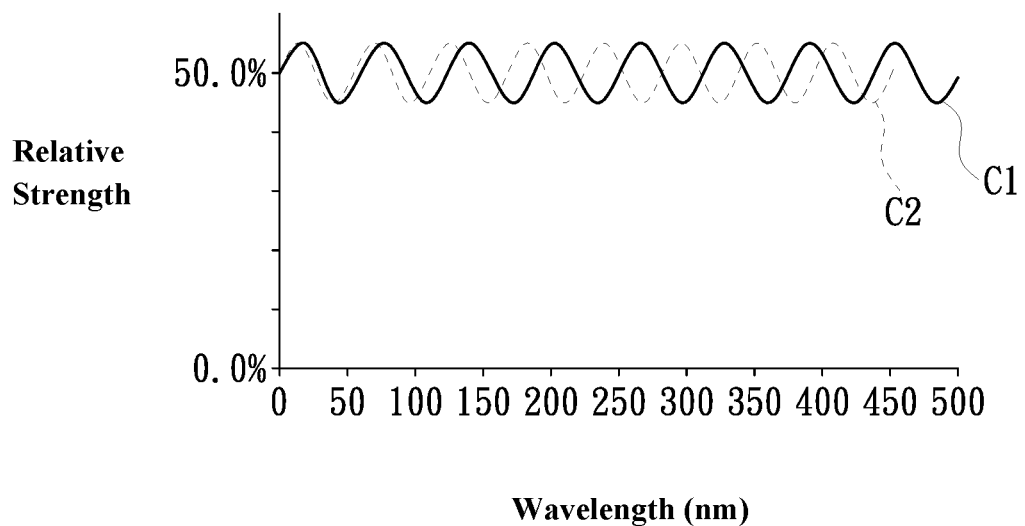
FIG. 1B is a spectrum diagram in which the light beam of FIG. 1A has respectively passed through a first interference film and a second interference film.

FIG. 1B is a spectrum diagram in which a light beam L1 has respectively passed the first interference film 110 and the second interference film 120. A curve C1 indicated by a solid line shows a spectrum of the light beam L1 after the light beam L1 only passes the first interference film 110 for the light filtering. A first ripple effect is being produced by the first interference film 110 where light beam L1 is passing through. A curve C2 indicated by a dashed line shows a spectrum of the light beam L1 after the light beam L1 only passes the second interference film 120 for the light filtering.

A second ripple effect is being produced by the second interference film 120 where the light beam L1 is passing through.

The first interference film 110 and the second interference film 120 have similar film structures, so the spectrums (shown as the curves C1 and C2 in FIG. 1B) produced by the light beam L1 passing the first interference film 110 and the second interference film 120 are similar as well. For example, the ripples of the curves C1 and C2 roughly have a same or similar amount of peaks and valleys, but the whereabouts and the Full Width at Half Maximum (FWHM) of the peaks and valleys of the curves C1 and C2 are obviously different.

In the embodiment, the thickness T1 is larger than the thickness T3, and the thickness T2 is larger than the thickness T4. That is, the thickness 110t of the first interference film 110 is larger than the thickness 120t of the second interference film 120. Therefore, the ripple (curve C1) produced by the first interference film 110 has a wider FWHM at its peak and valley, and the ripple (curve C2) produced by the second interference film 120 has a narrower FWHM at its peak and valley, so that the curve C1 looks like the curve C2 extended in a horizontal direction, and the curve C2 looks like the curve C1 compressed in the horizontal direction. In addition, in a certain wavelength range, e.g. in the wavelength range from 200 nm to 350 nm as shown in FIG. 1B, the peak of the curve C1 is aligning to the valley of the curve C2, and the valley of the curve C1 is aligning to the peak of the curve C2, so as to produce the destructive interference, in which the first ripple effect and the second ripple effect can be offset, as shown in FIG. 1C.

Figure 1C:
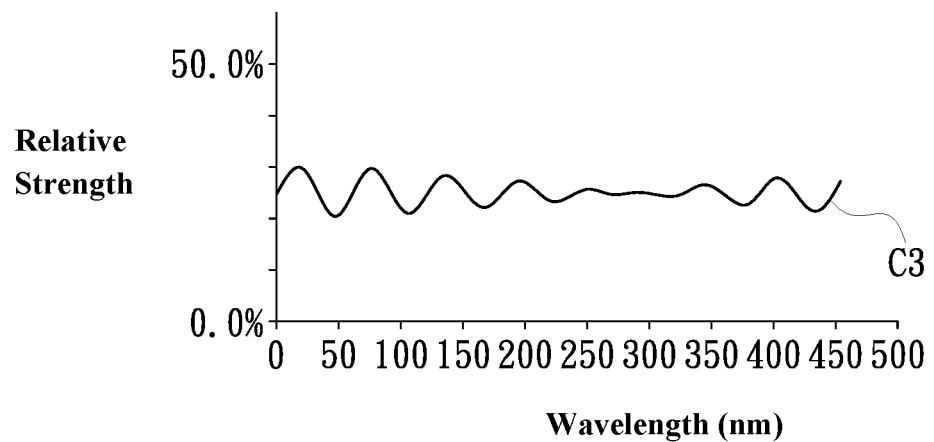
FIG. 1C is a spectrum diagram in which the light beam of FIG. 1A has passed through an optical filtering assembly.

With reference to FIG. 1B and FIG. 1C, a curve C3 shown in FIG. 1C refers to a spectrum of the light beam L1 passing through the second interference film 120 and the first interference film 110 in order. Because the destructive interference produced between the curves C1 and C2 in the wavelength range from 200 nm to 350 nm results in the offset of the first ripple effect and the second ripple effect, the influence caused by the ripples is reduced, and the smoother distribution curve C3 is thus produced. In particular, the curve C3 in the wavelength range from 200 nm to 350 nm has a shape similar to a smooth horizontal line. It can be seen that after being filtered by the optical filtering assembly 100, the spectrum of the light beam L1 in a certain wavelength range, (e.g. 200 nm-350 nm) appears a smoother distribution. Compared to conventional interference filters, the optical filtering assembly 100 in accordance with the present invention has a better filtering effect that is helpful to the improvement of the precision and accuracy of optical measuring instruments.

With reference to FIG. 1A, in the embodiment with respect to FIG. 1A, the first interference film 110 and the second interference film 120 are formed on the same substrate. In this regard, the optical filtering assembly 100 further comprises the first transparent substrate 101. The first transparent substrate 101 may be made of glass plate or sapphire substrate. The first interference film 110 and the second interference film 120 are formed on the first transparent substrate 101, wherein the first transparent substrate 101 is located between the first interference film 110 and the second interference film 120, and on the transmission path of the light beam L1. In other word, the first interference film 110 and the second interference film 120 are respectively formed on the opposite sides of the first transparent substrate 101, and also come into contact with the first transparent substrate 101.

The first interference film 110 and the second interference film 120 may be formed by means of deposition. For example, Chemical Vapor Deposition (CVD) may be adapted in the process of forming layers from the first film layer 111 to the fourth film layer 124, with the first interference film 110 and the second interference film 120 both formed in situ. That is, the first interference film 110 and the second interference film 120 are formed in a same chamber under vacuum condition, i.e. the first film layer 111, the second film layer 112, the third film layer 123 and the fourth film layer 124 are formed in situ.

FIG. 2A is a cross-sectional view of a light source device in accordance with another embodiment of the present invention. With reference to FIG. 2A, regarding a light source device 20a of the present invention, an optical filtering assembly 200a is similar to the optical filtering assembly 100 of the previous embodiment. For example, the optical filtering assembly 200a comprises the first interference film 110, the second interference film 120 and the first transparent substrate 101. But, unlike the optical filtering assembly 100, the optical filtering assembly 200a comprises the second transparent substrate 102. The second interference film 120 is formed on the second transparent substrate 102 and comes into contact with the second transparent substrate 102, instead of being formed on the first transparent substrate 101.

Specifically, the first interference film 110 is still disposed on the first transparent substrate 101 to form a first interference filter 201, but the second interference film 120 is disposed on the second transparent substrate 102 to form a second interference filter 202. Therefore, the first interference film 110 and the second interference film 120 are formed on two different transparent substrates, i.e. on the first transparent substrate 101 and the second transparent substrate 102. The optical filtering assembly 200a comprises at least two interference filters. i.e. the first interference filter 201 and the second interference filter 202. In addition, a material of the second transparent substrate 102 may be same as the material of the first transparent substrate 101.

The first interference film 110, the second interference film 120, the first transparent substrate 101 and the second transparent substrate 102 are arranged on the transmission path of the light beam L1. In this manner, the light beam L1 penetrates through the 202 and the 201 in order. The second interference film 120 is disposed between the first transparent substrate 101 and the second transparent substrate 102, and the first transparent substrate 101 is disposed between the first interference film 110 and the second interference film 120, so that the light beam L1 enters the second interference film 120 from the second transparent substrate 102, then enters the first interference film 110 from the first transparent substrate 101, and then leaves the optical filtering assembly 200a from the first interference film 110. In addition, the first interference filter 201 may be parallel to the second interference filter 202, so that the light beam L1 can be transmitted along optical axes of the first interference filter 201 and the second interference filter 202.

It is noted that the "parallel to" recited in the specification and the claims of the present invention includes "substantially parallel to". In details, when viewing the two filters (e.g. the first interference filter 201 and the second interference filter 202) directly with the naked eye, without using any measuring tools such as rulers or protractors, most viewers believe that they must be parallel to each other. However, the "parallel to" actually refers to "substantially parallel to". Therefore, when viewing the first interference filter 201 and the second interference filter 202 directly with the naked eye, most viewers would believe that the first interference filter 201 and the second interference filter 202 are parallel to each other.

Further, in the embodiment with respect to FIG. 2A, the second interference film 120 is disposed between the first transparent substrate 101 and the second transparent substrate 102, and the first transparent substrate 101 is disposed between the first interference film 110 and the second interference film 120. However, in an alternative embodiment such as the optical filtering assembly 200b of the light source device 20b shown in FIG. 2B, the first interference film 110 and the second interference film 120 are disposed between the first transparent substrate 101 and the second transparent substrate 102, so that the light beam L1 enters the second interference film 120 from the second transparent substrate 102, then enters the first transparent substrate 101 from the first interference film 110, and then leaves the optical filtering assembly 200b from the first transparent substrate 101.

In the embodiments with respect to FIG. 2A and FIG. 2B, each of the first film layers 111 has same thickness T1, each of the second film layers 112 has same thickness T2, each of the third film layers 113 has same thickness T3, and each of the fourth film layers 114 may have same thickness T4. However, this is just one of multiple alternative embodiments, and the present invention is not limited thereto. In other embodiments, the interference film may have different thickness in each of the film layers, or may have same thickness in parts of the film layers. For those skilled in the art, it is possible to make a variety of modification in the design of the film layers by requirements, without departing from the scope and spirit of the present invention. As to the design of the film layers, Chapter 3 of the mentioned book "Thin Film Optics and Coating Technology" can be taken for reference as well. The design of the film layers need not be repeated here.

Figure 2C:
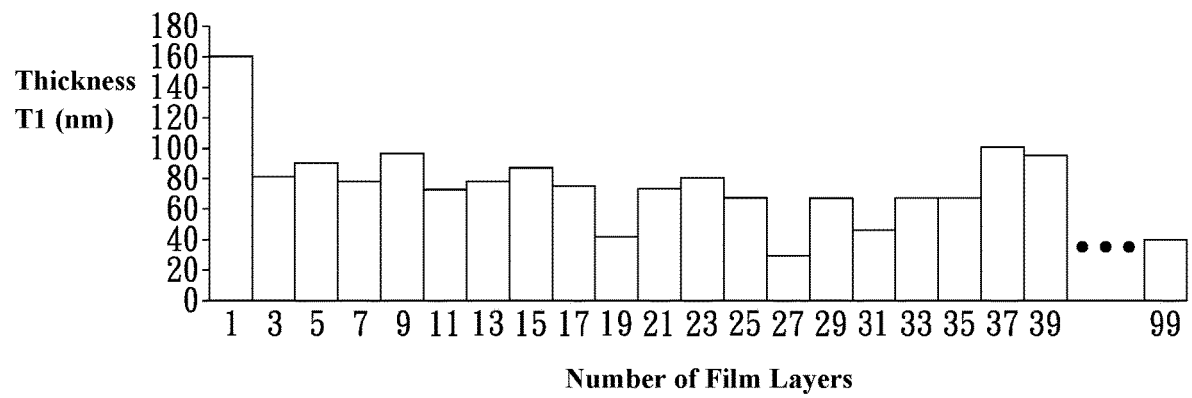
FIGS. 2C-2I are schematic diagrams showing optical film designs of interference films in accordance with another embodiments of the present invention.
Figure 2D:
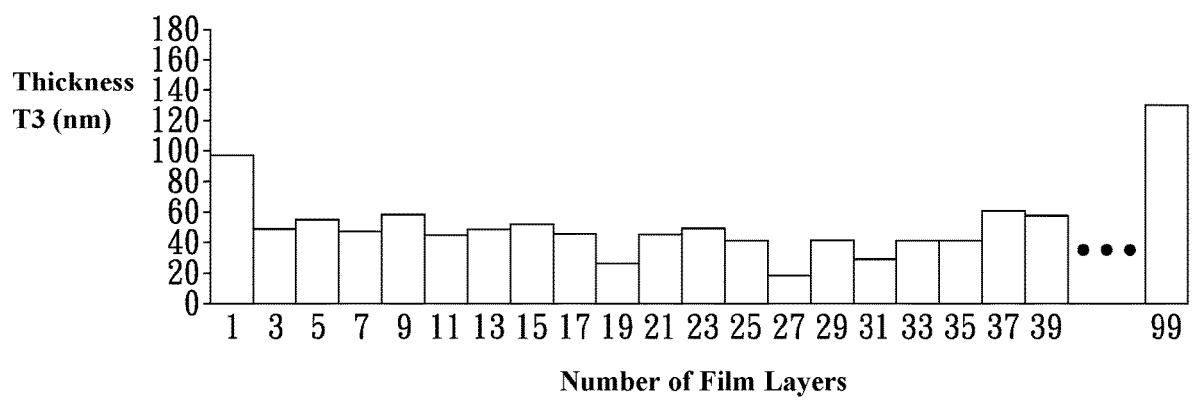
Figure 2E:
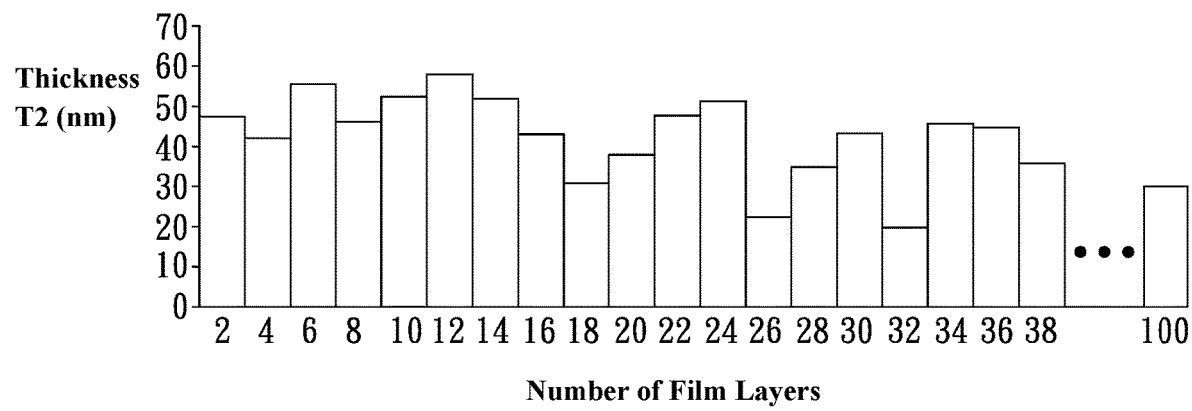
Figure 2F:
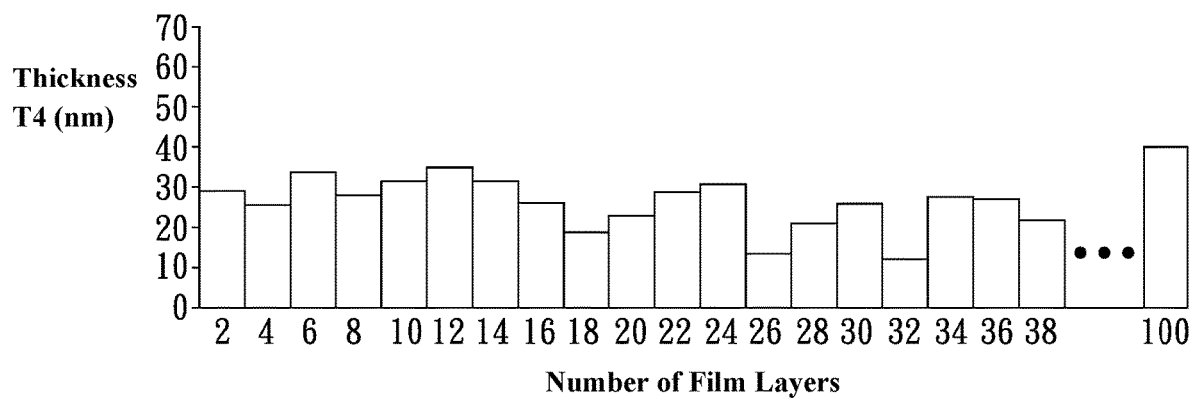

FIGS. 2C-2F are schematic diagrams of the first and second interference films as optical film designs in accordance with another embodiments of the present invention. FIG. 2C depicts each of odd-numbered layers of the first interference film. FIG. 2E depicts each of even-numbered layers of the first interference film. FIG. 2D depicts each of odd-numbered layers of the second interference film. FIG. 2F depicts each of even-numbered layers of the second interference film. From FIG. 2C to FIG. 2F, the vertical axes are numbers of film layers, and the horizontal axes are thickness of film layers. It can be seen from FIG. 2C to FIG. 2E that the film layers numbered 1, 3, 5 . . . are alternately stacked on the film layers numbered 2, 4, 6 . . . . In this embodiment, the bigger the number of the film layer is, the farther away the transparent substrate is from the film layer. On the other hand, the smaller the number of the film layer is, the closer to the transparent substrate the film layer is. In this embodiment, the first interference film has 100 film layers. The odd-numbered layers of the first interference film are made of a first material, and the even-numbered layers of the first interference film are made of a second material, wherein the first material is different with the second material. The second interference film has 100 film layers. The odd-numbered layers of the second interference film are made of a first material, and the even-numbered layers of the second interference film are made of a second material, wherein the first material is different with the second material.

The first interference film includes a first continuous film layer stack, and the second interference film includes a second continuous film layer stack. In this embodiment, the film layers numbered 1 to 39 in FIG. 2C and FIG. 2E are taken as an example to illustrate the first continuous film layer stack, and the film layers numbered 1 to 39 in FIG. 2D and FIG. 2F are taken as another example to illustrate the second continuous film layer stack. It is noted that the thickness of the second continuous film layer stack (i.e. the film layers numbered 1 through 39) is 0.6 times that of the first continuous film layer stack (i.e. the film layers numbered 1 through 39). In this embodiment, however, there is no common proportional relationship in thickness between the film layers numbered 40 through 100 in the first interference film and the film layers numbered 40 through 100 in the second interference film. That is, the first continuous film layer stack is 39% of total film layers in the first interference film, and the second continuous film layer stack is 39% of total film layers in the second interference film. Similar to the previous embodiment, this embodiment provides the continuous film layer stack (e.g. the first continuous film layer stack) as 39% of the interference film, which can also improve the problem caused by ripples. The 39% is only an example in this embodiment. Other ratio may be used in an alternative embodiment, such as a ratio more than 30%.

Further, the first interference film may include a first continuous film layer stack and a third continuous film layer stack, and the second interference film may include a second continuous film layer stack and a fourth continuous film layer stack. Thickness of each of film layers in the first continuous film layer stack (e.g. a first thickness distribution) is proportional to thickness of each of film layers in the second continuous film layer stack (e.g. a second thickness distribution) in a first ratio. Thickness of each of film layers in the third continuous film layer stack (e.g. a third thickness distribution) is proportional to thickness of each of film layers in the fourth continuous film layer stack (e.g. a fourth thickness distribution) in a second ratio. The first ratio is different with the second ratio. In this manner, the problem caused by ripples can be also improved.

Figure 2G:
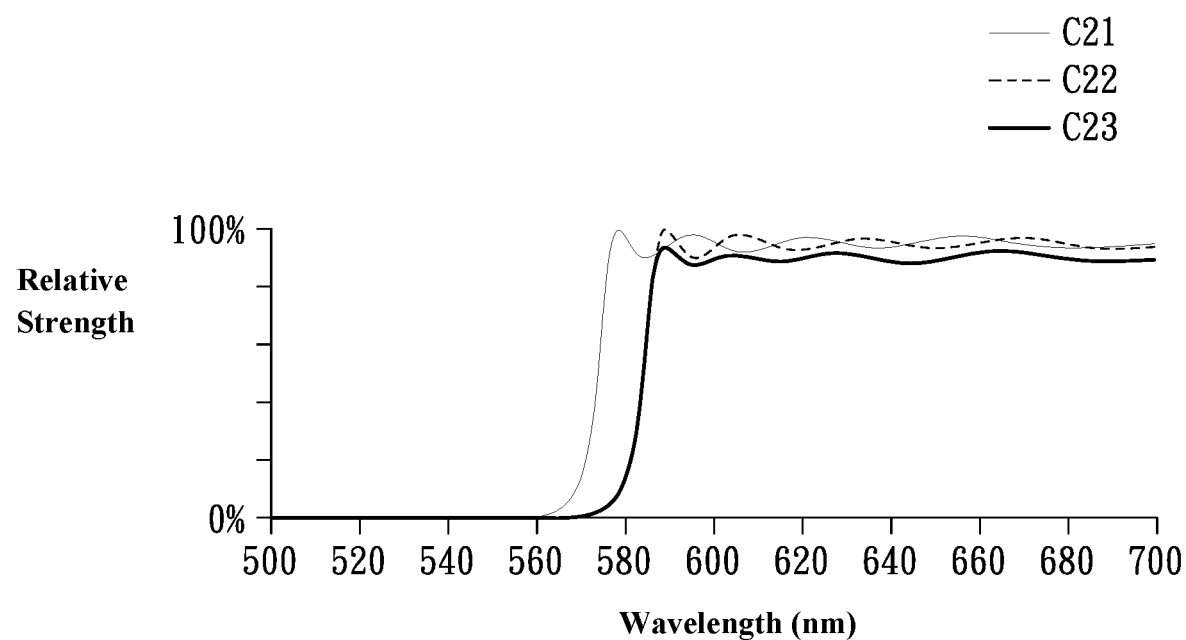
Figure 2H:
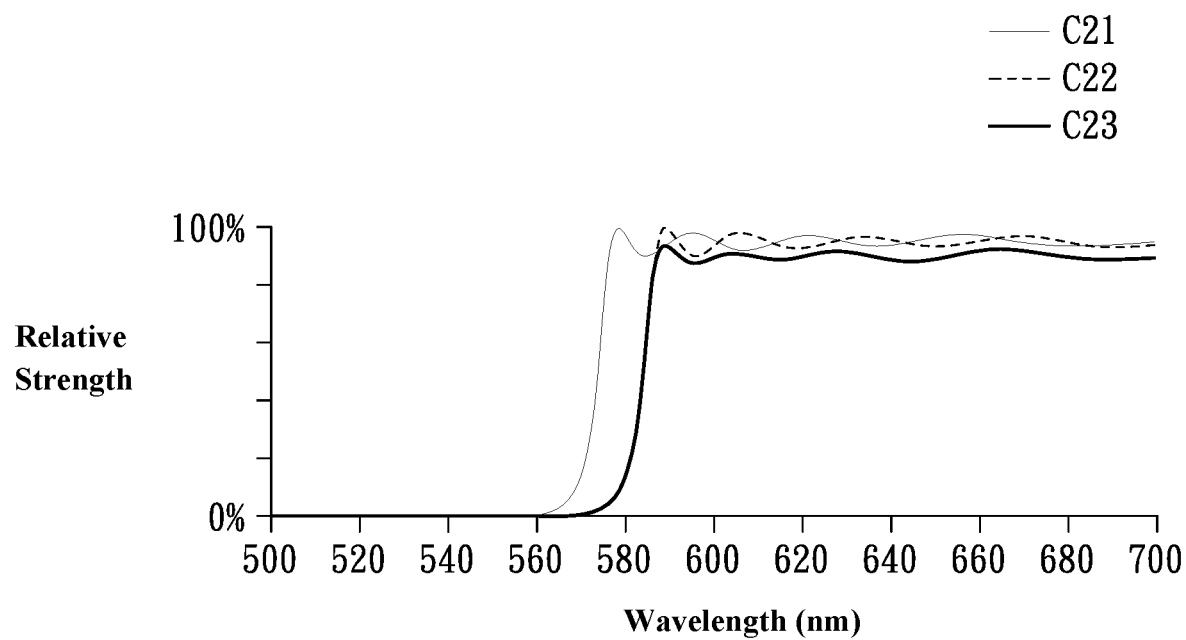
Figure 2I:
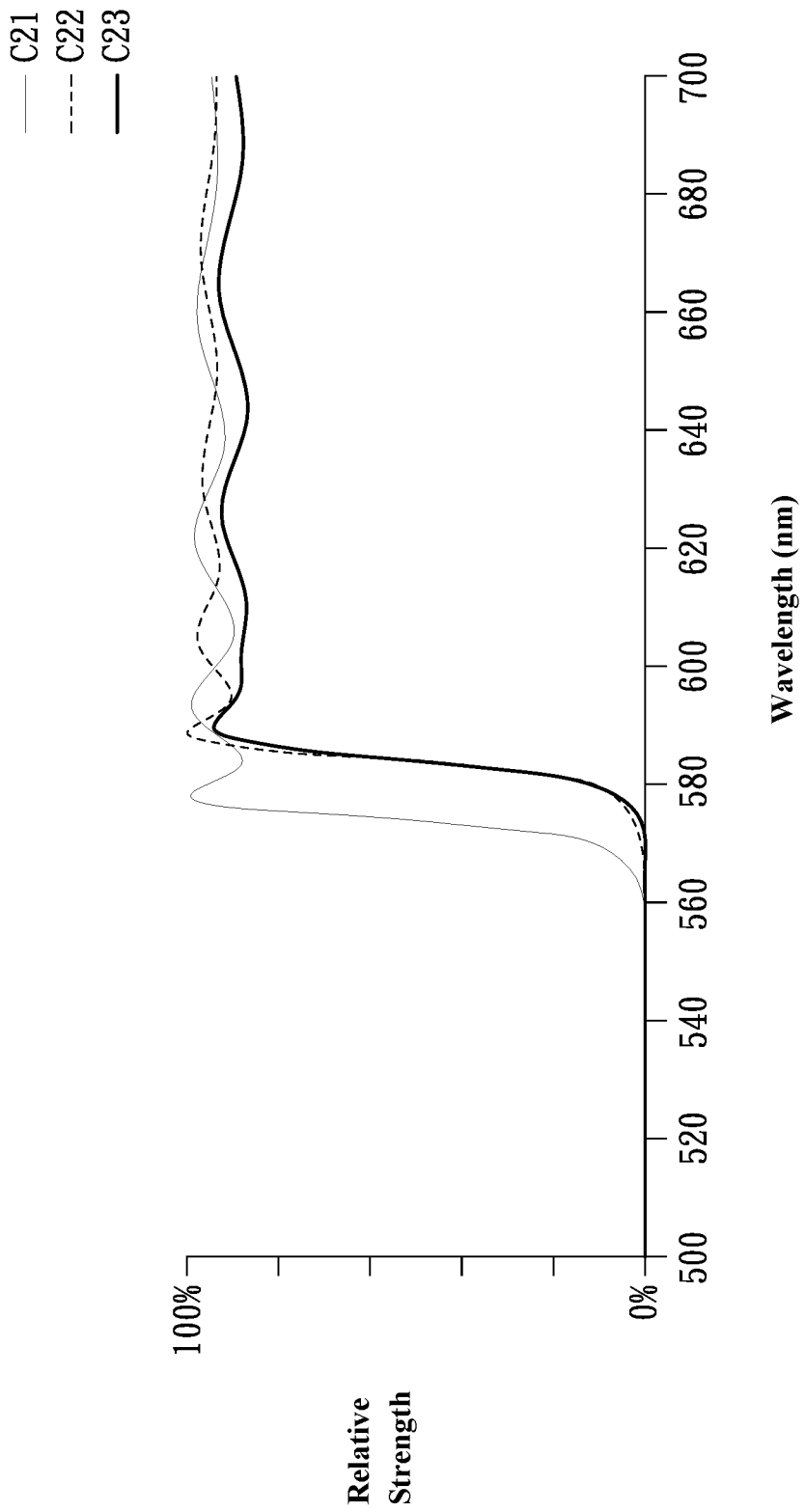

FIGS. 2G-2I are spectrum diagrams showing spectrums of the optical filtering assemblies. The optical filtering assemblies with respect to FIGS. 2G-2I are respectively shown as follows.

TABLE 1

Ratio of each of film layers in the first interference film to each of film layers in the second interference film is 0.98. (With respect to FIG. 2G)

| Number of film layers | Material of film layers | Thickness of each of film layers in the first interference film in nm | Thickness of each of film layers in the second interference film in nm |
|---|---|---|---|
| 1st layer | SiO2 | 94.69 | 92.80 |
| 2nd layer | TiO2 | 36.45 | 35.72 |
| 3rd layer | SiO2 | 100.90 | 98.89 |
| 4th layer | TiO2 | 45.52 | 44.61 |
| 5th layer | SiO2 | 66.78 | 65.45 |
| 6th layer | TiO2 | 46.19 | 45.27 |
| 7th layer | SiO2 | 66.83 | 65.49 |
| 8th layer | TiO2 | 19.80 | 19.40 |
| 9th layer | SiO2 | 47.00 | 46.06 |
| 10th layer | TiO2 | 43.71 | 42.83 |
| 11th layer | SiO2 | 67.32 | 65.97 |
| 12th layer | TiO2 | 35.33 | 34.62 |
| 13th layer | SiO2 | 29.16 | 28.57 |
| 14th layer | TiO2 | 22.39 | 21.94 |
| 15th layer | SiO2 | 67.31 | 65.96 |
| 16th layer | TiO2 | 51.61 | 50.58 |
| 17th layer | SiO2 | 80.37 | 78.77 |
| 18th layer | TiO2 | 48.03 | 47.07 |
| 19th layer | SiO2 | 73.60 | 72.13 |
| 20th layer | TiO2 | 38.18 | 37.42 |
| 21st layer | SiO2 | 41.40 | 40.58 |
| 22nd layer | TiO2 | 31.03 | 30.41 |
| 23rd layer | SiO2 | 75.24 | 73.74 |
| 24th layer | TiO2 | 43.29 | 42.42 |
| 25th layer | SiO2 | 86.75 | 85.01 |
| 26th layer | TiO2 | 52.01 | 50.97 |
| 27th layer | SiO2 | 79.30 | 77.72 |
| 28th layer | TiO2 | 58.26 | 57.10 |
| 29th layer | SiO2 | 73.27 | 71.80 |
| 30th layer | TiO2 | 52.83 | 51.78 |
| 31st layer | SiO2 | 96.49 | 94.56 |
| 32nd layer | TiO2 | 46.67 | 45.73 |
| 33rd layer | SiO2 | 78.76 | 77.18 |
| 34th layer | TiO2 | 55.69 | 54.58 |
| 35th layer | SiO2 | 90.16 | 88.36 |
| 36th layer | TiO2 | 42.41 | 41.56 |
| 37th layer | SiO2 | 81.29 | 79.67 |
| 38th layer | TiO2 | 47.79 | 46.84 |
| 39th layer | SiO2 | 160.94 | 157.72 |

TABLE 2

Ratio of each of film layers in the first interference film to each of film layers in the second interference film is 0.98, except for the 15th layer where the thicknesses in first and second interference films are the same. (With respect to FIG. 2H)

| Number of film layers | Material of film layers | Thickness of each of film layers in the first interference film in nm | Thickness of each of film layers in the second interference film in nm |
|---|---|---|---|
| 1st layer | SiO2 | 94.69 | 92.80 |
| 2nd layer | TiO2 | 36.45 | 35.72 |
| 3rd layer | SiO2 | 100.90 | 98.89 |
| 4th layer | TiO2 | 45.52 | 44.61 |
| 5th layer | SiO2 | 66.78 | 65.45 |
| 6th layer | TiO2 | 46.19 | 45.27 |
| 7th layer | SiO2 | 66.83 | 65.49 |
| 8th layer | TiO2 | 19.80 | 19.40 |
| 9th layer | SiO2 | 47.00 | 46.06 |
| 10th layer | TiO2 | 43.71 | 42.83 |
| 11th layer | SiO2 | 67.32 | 65.97 |
| 12th layer | TiO2 | 35.33 | 34.62 |
| 13th layer | SiO2 | 29.16 | 28.57 |
| 14th layer | TiO2 | 22.39 | 21.94 |
| 15th layer | SiO2 | 67.31 | 67.31 |
| 16th layer | TiO2 | 51.61 | 50.58 |
| 17th layer | SiO2 | 80.37 | 78.77 |
| 18th layer | TiO2 | 48.03 | 47.07 |
| 19th layer | SiO2 | 73.60 | 72.13 |
| 20th layer | TiO2 | 38.18 | 37.42 |
| 21st layer | SiO2 | 41.40 | 40.58 |
| 22nd layer | TiO2 | 31.03 | 30.41 |
| 23rd layer | SiO2 | 75.24 | 73.74 |
| 24th layer | TiO2 | 43.29 | 42.42 |
| 25th layer | SiO2 | 86.75 | 85.01 |
| 26th layer | TiO2 | 52.01 | 50.97 |
| 27th layer | SiO2 | 79.30 | 77.72 |
| 28th layer | TiO2 | 58.26 | 57.10 |
| 29th layer | SiO2 | 73.27 | 71.80 |
| 30th layer | TiO2 | 52.83 | 51.78 |
| 31st layer | SiO2 | 96.49 | 94.56 |
| 32nd layer | TiO2 | 46.67 | 45.73 |
| 33rd layer | SiO2 | 78.76 | 77.18 |
| 34th layer | TiO2 | 55.69 | 54.58 |
| 35th layer | SiO2 | 90.16 | 88.36 |
| 36th layer | TiO2 | 42.41 | 41.56 |
| 37th layer | SiO2 | 81.29 | 79.67 |
| 38th layer | TiO2 | 47.79 | 46.84 |

TABLE 2-continued

Ratio of each of film layers in the first interference film to each of film layers in the second interference film is 0.98, except for the 15th layer where the thicknesses in first and second interference films are the same. (With respect to FIG. 2H)

| Number of film layers | Material of film layers | Thickness of each of film layers in the first interference film in nm | Thickness of each of film layers in the second interference film in nm |
|---|---|---|---|
| 39th layer | SiO2 | 160.94 | 157.72 |

TABLE 3

Ratio of each of film layers in the first interference film to each of film layers in the second interference film is 0.98, except for the 37th-39th layers where the thicknesses in first and second interference films are the same. (With respect to FIG. 2I)

| Number of film layers | Material of film layers | Thickness of each of film layers in the first interference film in nm | Thickness of each of film layers in the second interference film in nm |
|---|---|---|---|
| 1st layer | SiO2 | 94.69 | 92.80 |
| 2nd layer | TiO2 | 36.45 | 35.72 |
| 3rd layer | SiO2 | 100.90 | 98.89 |
| 4th layer | TiO2 | 45.52 | 44.61 |
| 5th layer | SiO2 | 66.78 | 65.45 |
| 6th layer | TiO2 | 46.19 | 45.27 |
| 7th layer | SiO2 | 66.83 | 65.49 |
| 8th layer | TiO2 | 19.80 | 19.40 |
| 9th layer | SiO2 | 47.00 | 46.06 |
| 10th layer | TiO2 | 43.71 | 42.83 |
| 11th layer | SiO2 | 67.32 | 65.97 |
| 12th layer | TiO2 | 35.33 | 34.62 |
| 13th layer | SiO2 | 29.16 | 28.57 |
| 14th layer | TiO2 | 22.39 | 21.94 |
| 15th layer | SiO2 | 67.31 | 65.96 |
| 16th layer | TiO2 | 51.61 | 50.58 |
| 17th layer | SiO2 | 80.37 | 78.77 |
| 18th layer | TiO2 | 48.03 | 47.07 |
| 19th layer | SiO2 | 73.60 | 72.13 |
| 20th layer | TiO2 | 38.18 | 37.42 |
| 21st layer | SiO2 | 41.40 | 40.58 |
| 22nd layer | TiO2 | 31.03 | 30.41 |
| 23rd layer | SiO2 | 75.24 | 73.74 |
| 24th layer | TiO2 | 43.29 | 42.42 |
| 25th layer | SiO2 | 86.75 | 85.01 |
| 26th layer | TiO2 | 52.01 | 50.97 |
| 27th layer | SiO2 | 79.30 | 77.72 |
| 28th layer | TiO2 | 58.26 | 57.10 |
| 29th layer | SiO2 | 73.27 | 71.80 |
| 30th layer | TiO2 | 52.83 | 51.78 |
| 31st layer | SiO2 | 96.49 | 94.56 |
| 32nd layer | TiO2 | 46.67 | 45.73 |
| 33rd layer | SiO2 | 78.76 | 77.18 |
| 34th layer | TiO2 | 55.69 | 54.58 |
| 35th layer | SiO2 | 90.16 | 88.36 |
| 36th layer | TiO2 | 42.41 | 41.56 |
| 37th layer | SiO2 | 81.29 | 81.29 |
| 38th layer | TiO2 | 47.79 | 47.79 |
| 39th layer | SiO2 | 160.94 | 160.94 |

With reference to FIGS. 2G-2I, which shows simulating spectrum diagrams drawn on a basis of the references listed in above Tables, a curve C21 represents the first interference film, and a curve C22 represents the second interference film, and a curve C23 represents a spectrum formed along with the interference between the curve C21 and the curve C22, as a result of superposition of the curve C21 and the curve C22. It can be seen from FIG. 2G to FIG. 2I that the optical filtering assembly appears a smoother spectrum distribution after the wavelength of 580 nm (such as curve C23). That is, the first and second ripple effects caused by the first and second interference films can be offset to reduce the undesirable influence caused by the ripples, and to produce the smoother spectrum distribution of the curve C23 as shown in FIG. 2I. As a result, the optical filtering assemblies in accordance with the above Tables have better filtering effects as well that is helpful to the improvement of the precision and accuracy of optical measuring instruments.

Figure 3:
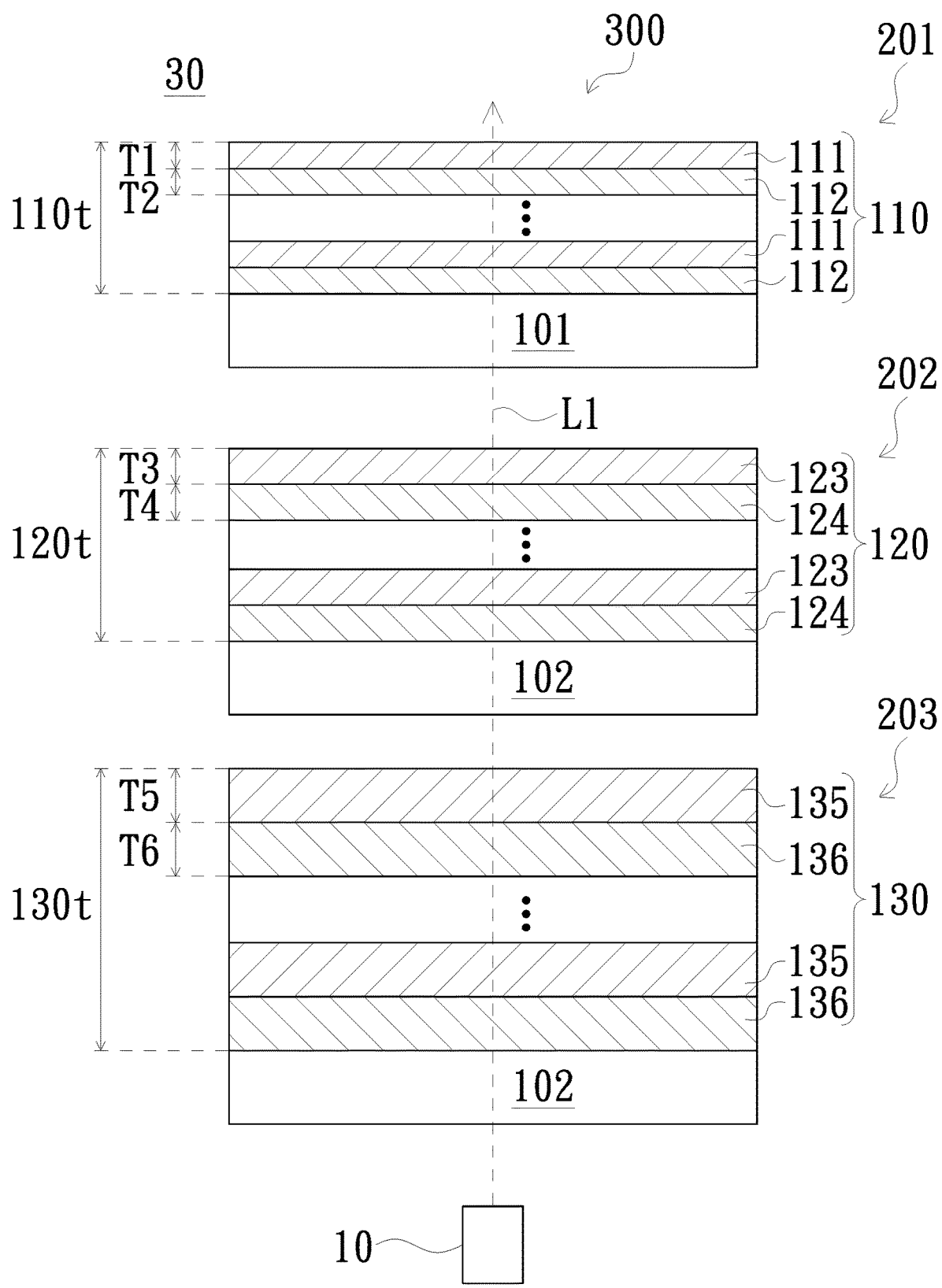
FIG. 3 is a cross-sectional view of a light source device in accordance with another embodiment of the present invention.

FIG. 3 is a cross-sectional view of a light source device in accordance with another embodiment of the present invention. With reference to FIG. 3, the light source device 30 of this embodiment is similar to the light source device 20a of the embodiment with respect to FIG. 2A. For example, the optical filtering assembly 300 comprises the first interference filter 201 and the second interference filter 202. But, unlike the optical filtering assembly 200a of FIG. 2A, the optical filtering assembly 300 further comprises a third interference filter 203. That is, the optical filtering assembly 300 at least comprises three interference filters, e.g. the first interference filter 201, the second interference filter 202 and the third interference filter 203, wherein the three interference filters are arranged on the transmission path of the light beam L1 and parallel to each other, as shown in FIG. 3.

Specifically, the optical filtering assembly 300 comprises a third transparent substrate 103 and a third interference film 130. The third interference film 130 is disposed on the third transparent substrate 103 to form a third interference filter 203. That is, the third interference filter 203 comprises the third interference film 130 and the third transparent substrate 103. The third interference film 130 is a multilayer film comprising multiple fifth film layers 135 and multiple sixth film layers 136. The fifth film layers 135 and the sixth film layers 136 are alternately stacked. In addition, an OPD produced by the light beam L1 in the third interference film 130 is different from OPDs produced by the light beam L1 in the first interference film 110 or in the second interference film 120.

The fifth interference film 135 may be made of high refractive index material, and the sixth film layers 136 may be made of low refractive index material. The material of the fifth interference film 135 may be same as that of the first film layer 111, and the material of the sixth film layer 136 may be same as that of the second film layer 112. Therefore, the optical constant of the fifth interference film 135 is same as that of the first film layer 111, and the optical constant of the sixth film layer 136 may be same as that of the second film layer 112. In addition, the fifth interference film 135 and the sixth film layers 136 may be formed by means of deposition, such as Chemical Vapor Deposition (CVD). Therefore, the third interference film 130 is formed in the same manner that at least two kinds of film layers having different optical constants are alternately stacked. In addition, in this embodiment, the fifth interference film 135 is made of high refractive index material, and the sixth film layers 136 is made of low refractive index material. But in other embodiment, the fifth interference film 135 may be made of low refractive index material, and the sixth film layers 136 may be made of high refractive index material.

In this embodiment, for the third interference film 130, each of the fifth film layers 135 has a thickness T5, and each of the sixth film layers 136 has a thickness T6. A ratio between the thickness T5 of each fifth film layer 135 and the thickness T6 of each sixth film layer 136 may be same as the ratio of thickness of each of film layers stacked in the first interference film 110 and in the second interference film 120. For example, for four adjacent film layers in the first interference film 110, a thickness ratio of the first film layer 111, the second film layer 112, the first film layer 111, and the second film layer 112 is 1:2:3:6, and for four adjacent film layers in the third interference film 130, a thickness ratio of the fifth film layer 135, the sixth film layer 136, the fifth film layer 135, and sixth film layer 136 is 1:2:3:6. In addition, a thickness 130t of the third interference film 130 may not have to be same as at least one of the thickness 110t and the thickness 120t, wherein at least one of the thickness T1 and the thickness T3 may not have to be same as the thickness T5, and at least one of the thickness T2 and the thickness T4 may not have to be same as the thickness T6.

Figure 4A:
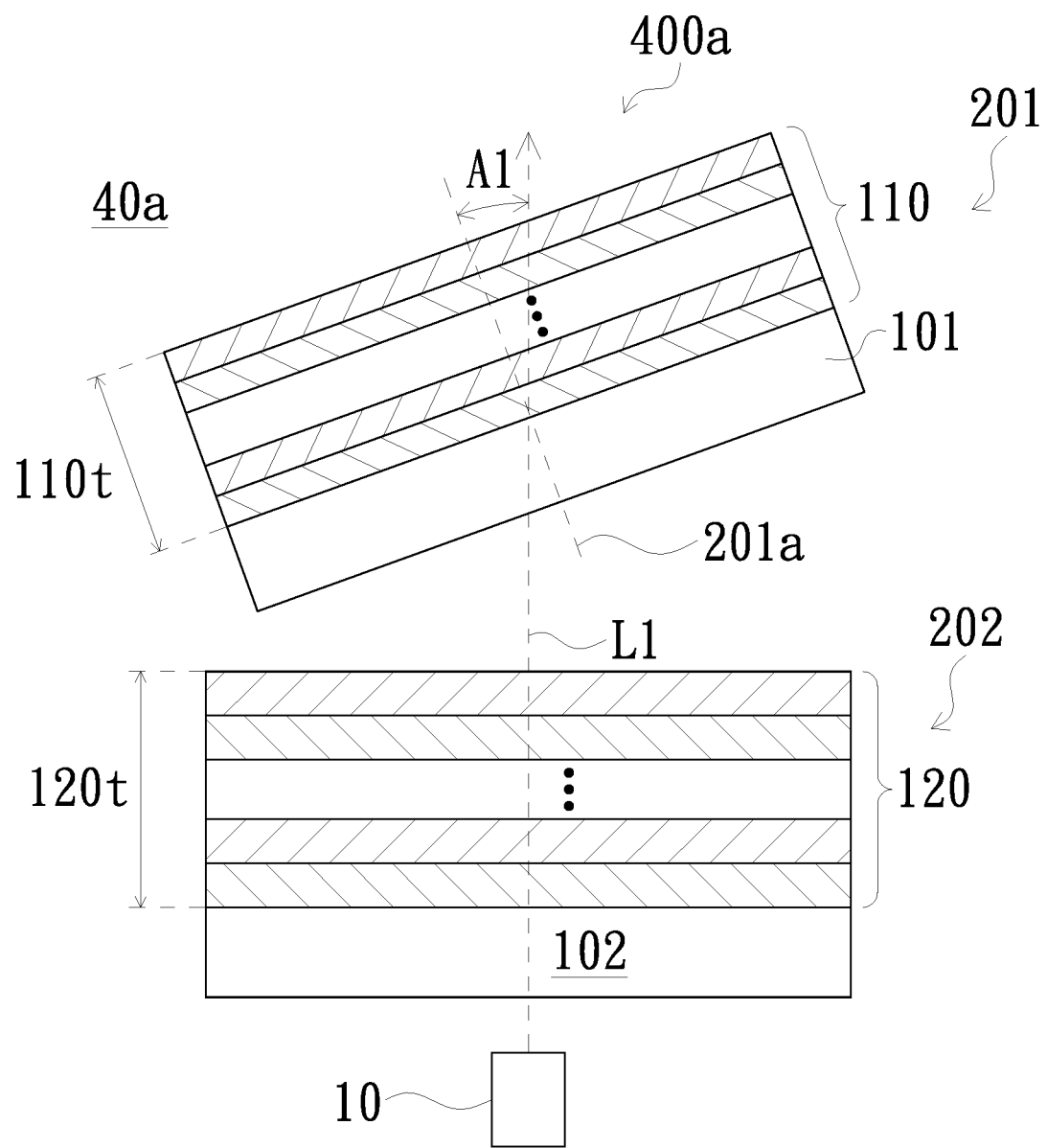
FIG. 4A is a cross-sectional view of a light source device in accordance with another embodiment of the present invention.

FIG. 4A is a cross-sectional view of a light source device in accordance with another embodiment of the present invention. With reference to FIG. 4A, a light source device 40a is similar to the light source device 20a described in the embodiment with respect to FIG. 2A. For example, the optical filtering assembly 400a also comprises the first interference filter 201 and the second interference filter 202. The difference between the optical filtering assembly 400a and the optical filtering assembly 200a is that the first interference filter 201 is not parallel to and not perpendicular to the second interference filter 202. It is noted that "not parallel to" and "not perpendicular to" recited in the specification and the claims of the present invention means that when viewing directly with the naked eye without using any measuring tools such as rulers, protractor, etc., viewers would find the two filters (e.g. the first interference filter 201 and the second interference filter 202) not parallel to and not perpendicular to each other.

Although it is shown in FIG. 2A and FIG. 4A that the light beam L1 penetrates the first interference filter 201, the light beam L1 is not incident on the first interference filter 201 along a normal 201a of the first interference filter 201 due to the first interference filter 201 not parallel to and not perpendicular to the second interference filter 202. Therefore, the OPL of the light beam L1 in the first interference film 110 of FIG. 2A is different from that in the first interference filter 201 of FIG. 4A, so that the OPD produced in the first interference filter 201 of FIG. 2A is different from the OPD produced in the first interference filter 201 of FIG. 4A. So, as to the same light beam L1, the filtering effect provided by the optical filtering assembly 400a of FIG. 4A is different with that provided by the optical filtering assembly 200a of FIG. 2A.

An angle A1 of 30 degrees between the normal 201a of the first interference filter 201 and the transmission path of the light beam L1 is hereby taken as an example. In other embodiments, those in the art can modify the angle A1 by the requirement of the improvement on the ripple range. It can be seen from FIG. 4A that the OPL of the light beam L1 in the first interference filter 201 is related to the angle A1, so that the degree of the angle determines the OPD of the first interference filter 201, thus to control the optical filtering assembly 400a filtering the light beam L1. In addition, in this embodiment, the first interference filter 201 can rotate relative to the second interference filter 202. By the rotation of the first interference filter 201, the filtering effect of the optical filtering assembly 400a can be adjusted.

Figure 4B:
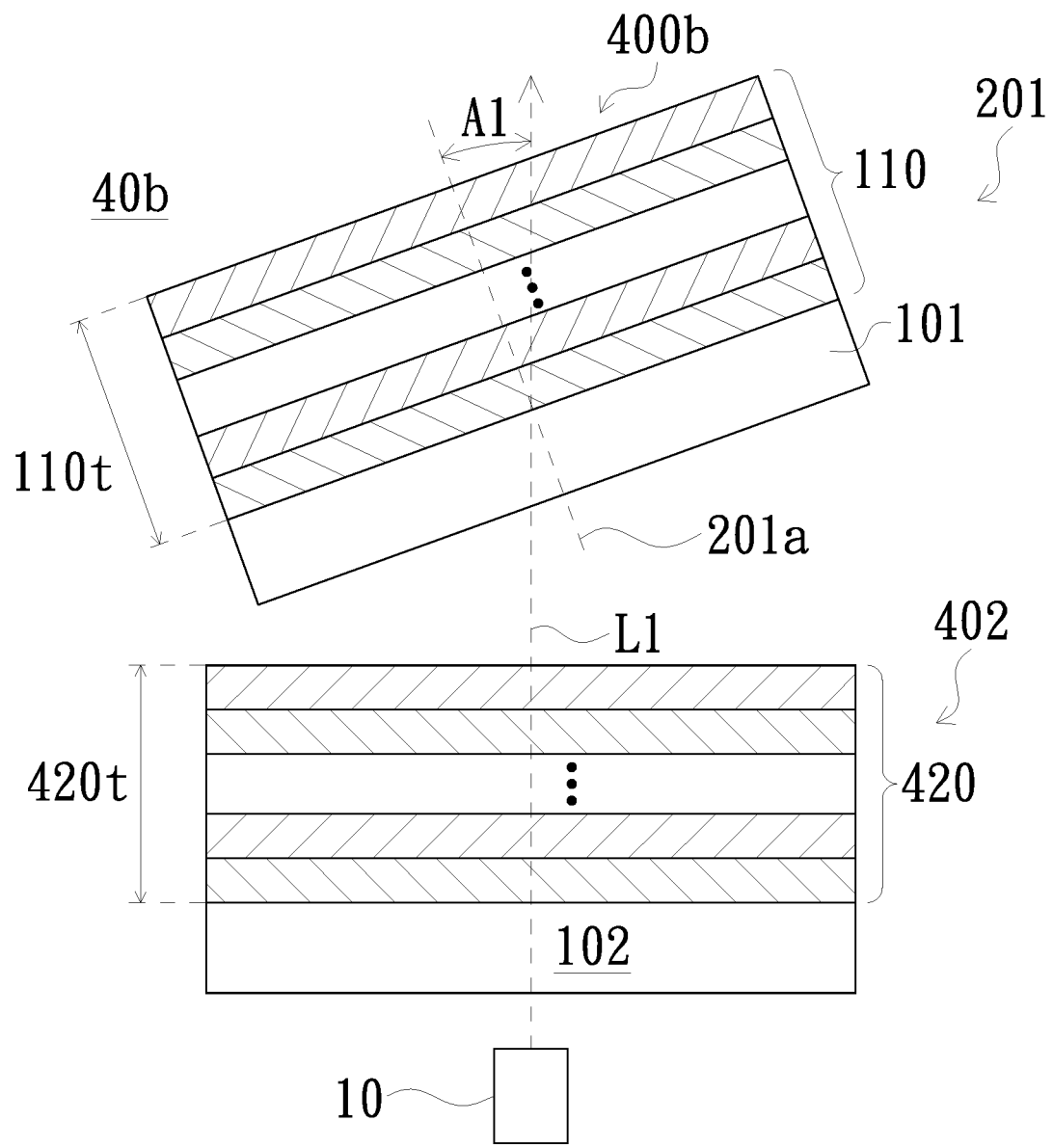
FIG. 4B is a cross-sectional view of a light source device in accordance with another embodiment of the present invention.

FIG. 4B is a cross-sectional view of a light source device in accordance with another embodiment of the present invention. With reference to FIG. 4B, a light source device 40b of FIG. 4B is similar to the light source device 40a of FIG. 4A. In detail, the optical filtering assembly 400b and the optical filtering assembly 400a comprise the same components, such as the first interference filter 201. The difference is that the optical filtering assembly 400b comprises two same interference filters.

The optical filtering assembly 400b comprises the first interference filter 201 and a second interference filter 402, wherein the second interference filter 402 comprises the second transparent substrate 102 and a second interference film 420. The second interference film 420 is formed on the second transparent substrate 102. The second interference film 420 is same as the first interference film 110, which means that the second interference film 420 is a multilayer film comprising multiple first film layers 111 and multiple second film layers 112 (not shown in FIG. 4B). In addition, a thickness 420t of the second interference film 420 is same as the thickness 110t of the first interference film 110. Therefore, the second interference film 420 is actually the first interference filter 201. That is, the optical filtering assembly 400b substantially comprises two same interference filters (i.e. the first interference filter 201), wherein the second interference film 420 and the first interference film 110 are both formed in situ. In other word, in this embodiment, the optical filtering assembly 400b can take use of two interference filters made in a same manufacturing process. By the arrangement of the two interference filters (i.e. the angle set between the two interference filters), the problem caused by ripples can be improved.

Although the second interference filter 402 is same as the first interference filter 201 in the optical filtering assembly 400b, the OPD produced by the first interference film 110 is different with the OPD produced by the second interference film 420 due to the second interference filter 402 not parallel to and not perpendicular to the first interference filter 201, wherein the angle A1 between the normal 201a of the first interference filter 201 and the transmission path of the light beam L1 may be set equal to or greater than 0 degree, and equal to or smaller than 70 degree. Further, it is the same as the optical filtering assembly 400a in that the first interference filter 201 can also rotate relative to the second interference filter 402, so as to control the filtering effect of the optical filtering assembly 400a, and thus to remove unwanted light.

In addition, because the second interference filter 402 is same as the first interference filter 201, and the second interference film 420 and the first interference film 110 are formed in situ, when the light beam is incident along the normal of both the second interference filter 402 and the first interference filter 201, the ripple effect produced by the second interference filter 402 and the ripple effect produced by the first interference filter 201 are substantially same. Nevertheless, because the second interference filter 402 and the first interference filter 201 are not parallel to and perpendicular to each other, which causes that the OPD produced by the first interference film 110 is different with the OPD produced by the second interference film 420, it is possible to make both of the second interference filter 402 and the first interference filter 201 produce different ripple effects which may be offset each other by adjusting the angle A1, so as to reduce the influence caused by the ripples.

Figure 4C:
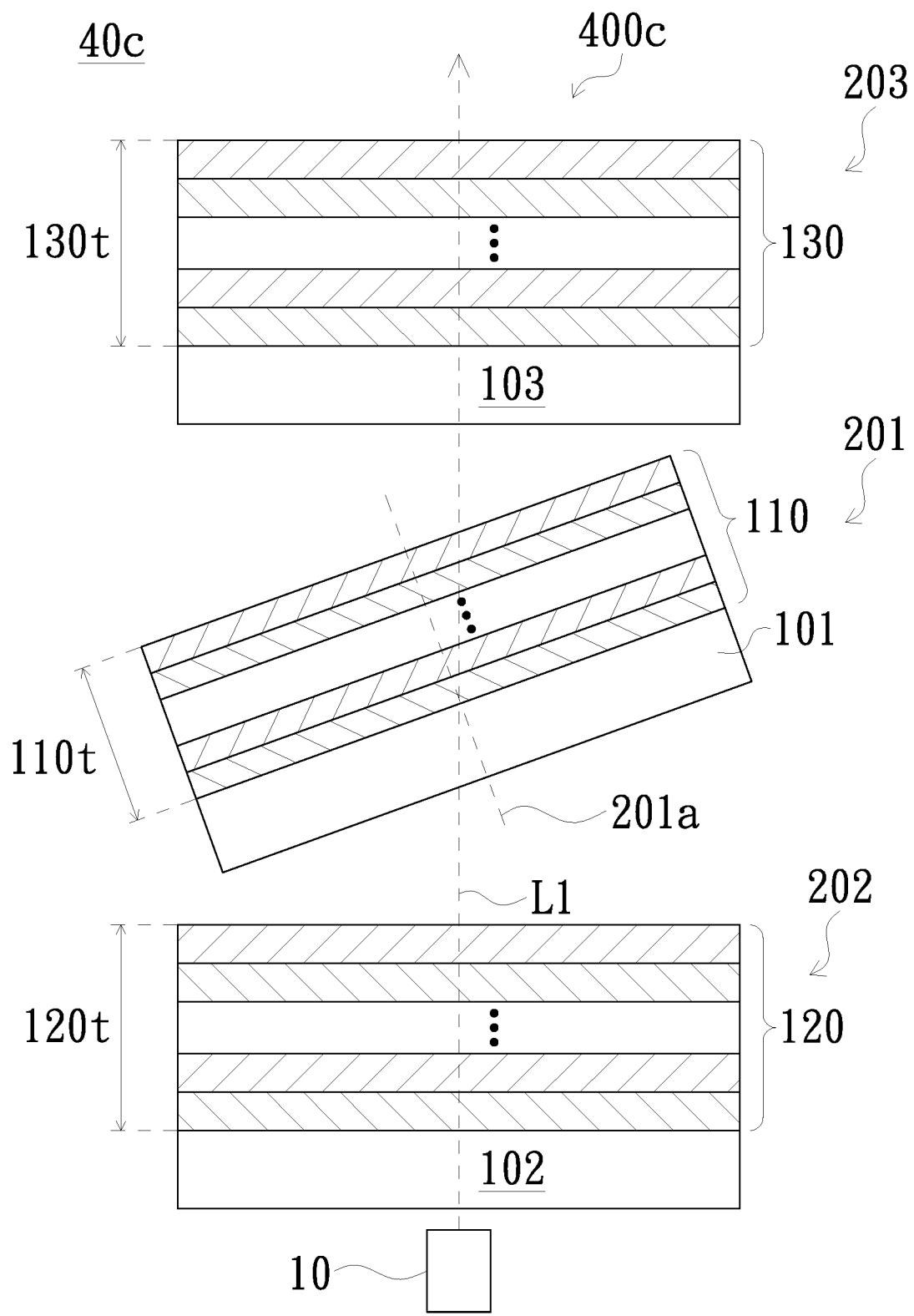
FIG. 4C is a cross-sectional view of a light source device in accordance with another embodiment of the present invention.

It is noted that in the embodiments with respect to FIG. 4A and FIG. 4B, the optical filtering assemblies 400a and 400b comprise two interference filters, respectively. But in an alternative embodiment, an interference filter may be additionally added in the optical filtering assembly 400a or 400b, such as an optical filtering assembly 400c in an embodiment with respect to FIG. 4C. With reference to FIG. 4C, the optical filtering assembly 400c of a light source device 40c comprises at least three interference filters such as the first interference filter 201, the second interference filter 202 and the third interference filter 203, wherein the third interference filter 203 is parallel to the first interference filter 201 or the second interference filter 202. An example is shown in FIG. 4C that the third interference filter 203 is parallel to the second interference filter 202, but is not parallel to and not perpendicular to the first interference filter 201.

In the embodiment with respect to FIG. 4C, the first interference filter 201, the second interference filter 202 and the third interference filter 203 that are included in the optical filtering assembly 400c are different interference filters. And according to the previous embodiments, the thicknesses of the interference films of the three interference filters are all different. In other embodiment, the optical filtering assembly 400c may comprise at least two same interference filters. Therefore, as shown in FIG. 4C, at least one of the first interference filter 201, the second interference filter 202 and the third interference filter 203 can be changed, to make the optical filtering assembly 400c comprise at least two same interference filters.

For example, the second interference filter 202 of FIG. 4C may be changed to the second interference filter 402 of FIG. 4B to make the optical filtering assembly 400c comprise at least two same interference filters. Alternatively, the second interference filter 202 and the third interference filter 203 of FIG. 4C may be changed to the first interference filter 201, to make the optical filtering assembly 400c comprise at least three same interference filters (i.e. the first interference filter 201).

In the embodiment with respect to FIG. 4C, the first interference filter 201 is disposed between the second interference filter 202 and the third interference filter 203 and is not parallel to and perpendicular to the second interference filter 202 and the third interference filter 203. However, the arrangement of the first interference filter 201, the second interference filter 202 and the third interference filter 203 may be changeable in other embodiments. For example, the second interference filter 202 is disposed between the first interference filter 201 and the third interference filter 203 and is not parallel to and perpendicular to the first interference filter 201 and the third interference filter 203. Alternatively, the third interference filter 203 is disposed between the first interference filter 201 and the second interference filter 202, and the second interference filter 202 is not parallel to and perpendicular to the first interference filter 201 and the third interference filter 203. Therefore, FIG. 4C is taken only for an example, and the arrangement of the first interference filter 201, the second interference filter 202 and the third interference filter 203 is not limited thereto.

In particular, in the above embodiments, the thicknesses of the interference films involved in the optical filtering assemblies 100-400c, such as the thickness 110t of the first interference film 110, are well-distributed, and the thickness ratios between these film layers (e.g. the first to fourth film layers 111, 112, 123 and 124) may be the same, wherein the "well-distributed" and the "the same" refer to "substantially well-distributed" and the "substantially the same". In detail, in a manufacturing process of interference films, due to the inevitable restrictions in manufacturing equipments that cause some tolerances on thicknesses of the film layers (e.g. the first film layer 111) of the interference films, the thicknesses of the interference films are found in the micron scale not well-distributed, and the thickness ratios between the film layers are found in the micron scale not the same. For example, the thickness ratio between the first film layers 111 and the second film layer 112 adjacent thereto is not the same as the thickness ratio between the third film layers 123 and the fourth film layer 124 adjacent thereto. The unintentional consequences that the thicknesses of the interference films are not well-distributed and the thickness ratios between the film layers are not the same, would not affect the filtering effect of the optical filtering assemblies 100-400c. Said "substantially well-distributed" for the thickness covers said "not well-distributed" for the thickness, and said "substantially the same" for the thickness ratio covers said "not the same" for the thickness ratio. Nevertheless, for an optical filtering assembly in other embodiment, the interference films may have intentionally made "not well-distributed" thicknesses, as shown in FIG. 5A.

Figure 5A:
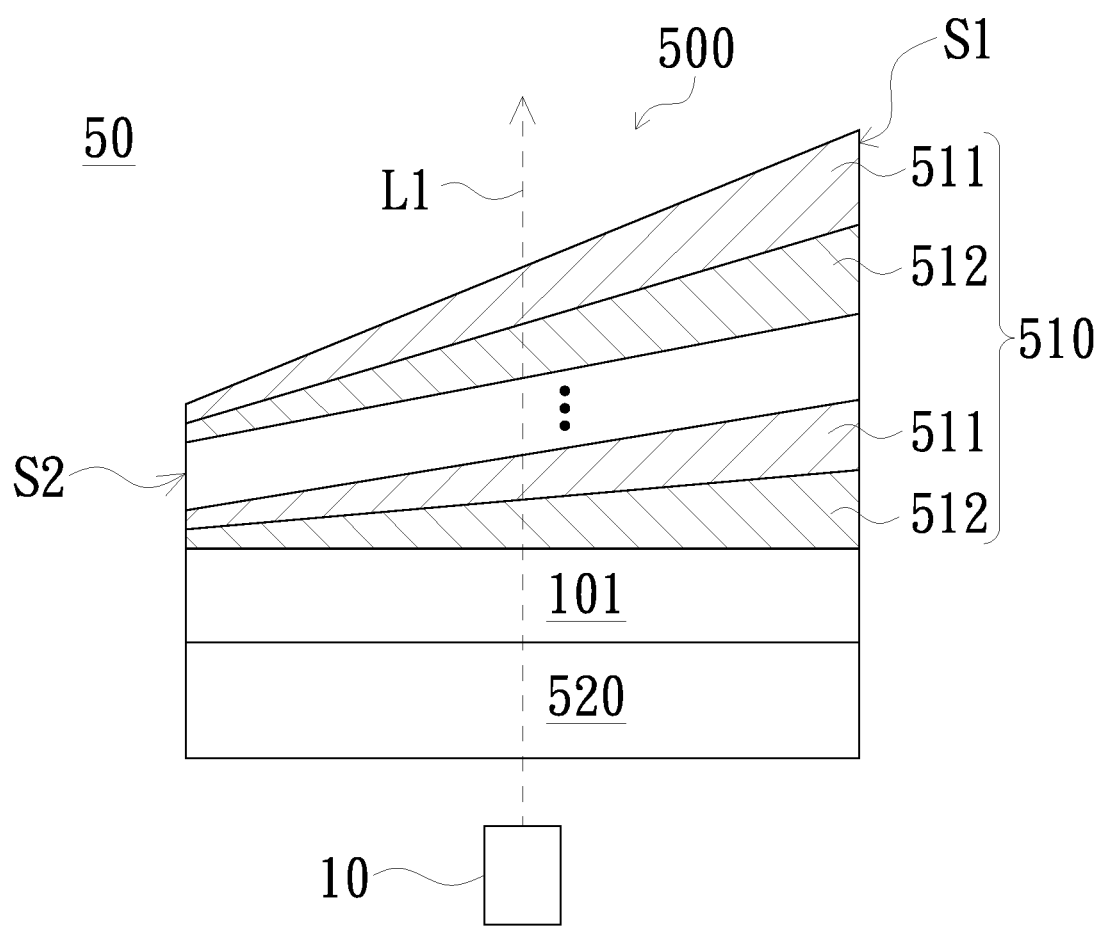
FIG. 5A is a cross-sectional view of a light source device in accordance with another embodiment of the present invention.

FIG. 5A is a cross-sectional view of a light source device in accordance with another embodiment of the present invention. With reference to FIG. 5A, in a light source device 50, an optical filtering assembly 500 comprises a first interference film 510, the first transparent substrate 101 and a second interference film 520, wherein the second interference film 520 may be the interference film described in the previous embodiment, such as the first interference film 110, the second interference film 120 or the third interference film 130, and the first transparent substrate 101 is disposed between the first interference film 510 and the second interference film 520. The difference from the previous embodiment is that a thickness of the first interference film 510 is not well-distributed, as shown in FIG. 5A.

The first interference film 510 is a multilayer film comprising multiple first film layers 511 and multiple second film layers 512. The first film layers 511 and the second film layers 512 are alternately stacked. A material of the first film layers 511 and the second film layers 512 may be same as that of the first film layer 111 and the second film layer 112. The first interference film 510 has a first side S1 and a second side S2 opposite the first side S1. A thickness of the first interference film 510 gradually decreases from the first side S1 toward the second side S2, so that a top of the first interference film 510 forms an inclined surface as shown in FIG. 5A. In addition, the first interference film 510 may be formed by means of deposition, such as Physical Vapor Deposition (PVD). In a process of Chemical Vapor Deposition (CVD), the first interference film 510 that is not well distributed in thickness may be formed by inclining the first transparent substrate 101, or by blocking out an evaporation source in use of a shelter.

When the light beam L1 enters the first interference film 510, at least two rays in the light beam L1 have different OPLs in the first interference film 510. FIG. 5A is an example that in the light beam L1, an OPL near the second side S2 is smaller than an OPL near the first side S1. Therefore, the OPLs of the light beam L1 produced in the first interference film 510 are not consistent with each other, so that the first interference film 510 can not only interfere with the light beam L1 for filtering the light beam L1, but also can compensate the light beam L1 that has gone through the second interference film 520 to reduce the influence caused by the ripples.

Figure 5B:
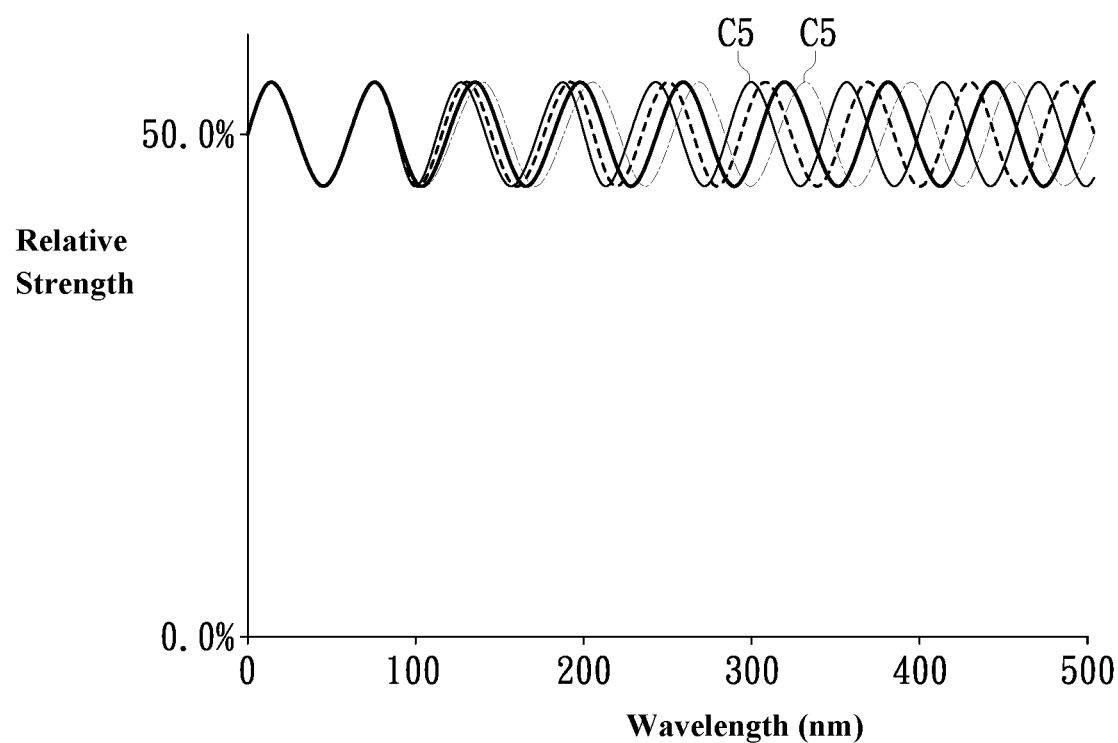
FIGS. 5B and 5C are spectrum diagrams in which the light beam of FIG. 5A has passed through a first interference film and a second interference film.
Figure 5C:
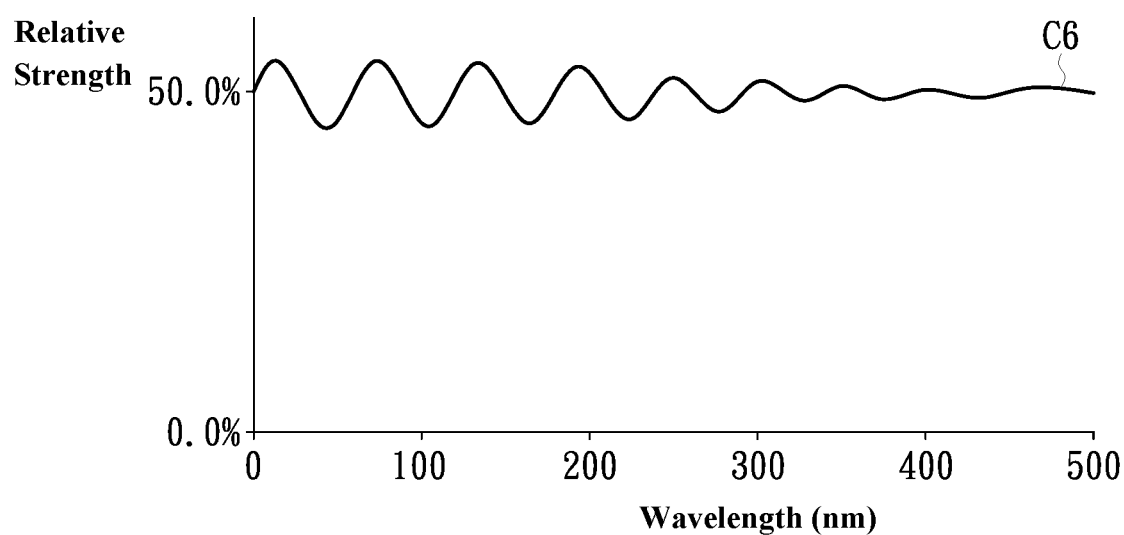

With reference to FIG. 5A, FIG. 5B and FIG. 5C, after the light beam L1 passing through the first interference film 510, multiple rays of the light beam L1 may produce multiple different spectrums with respect to multiple different sections of the first interference film 510, such as multiple different curves C5 shown in FIG. 5B due to the thickness of the first interference film 510 gradually decreasing from the first side S1 toward the second side S2, wherein the curves C5 respectively bring different ripple effects that the first interference film 510 offers to the light beam L1. As described in the previous embodiment with respect to FIG. 1B and FIG. 1C, the different curves C5 of FIG. 5B would be superimposed with each other to produce interference, thus to produce a smoother distribution spectrum, such as a curve C6 shown in FIG. 5C. Specifically, in FIG. 5C, these curves C5 in a wavelength range from 300 nm to 500 nm would produce destructive interference in which the ripple effects of these curves C5 are offset, so as to reduce the influence caused by the ripples and generate the curve C6 which in the wavelength range from 300 nm to 500 nm has a shape similar to a smooth horizontal line.

Figure 6:
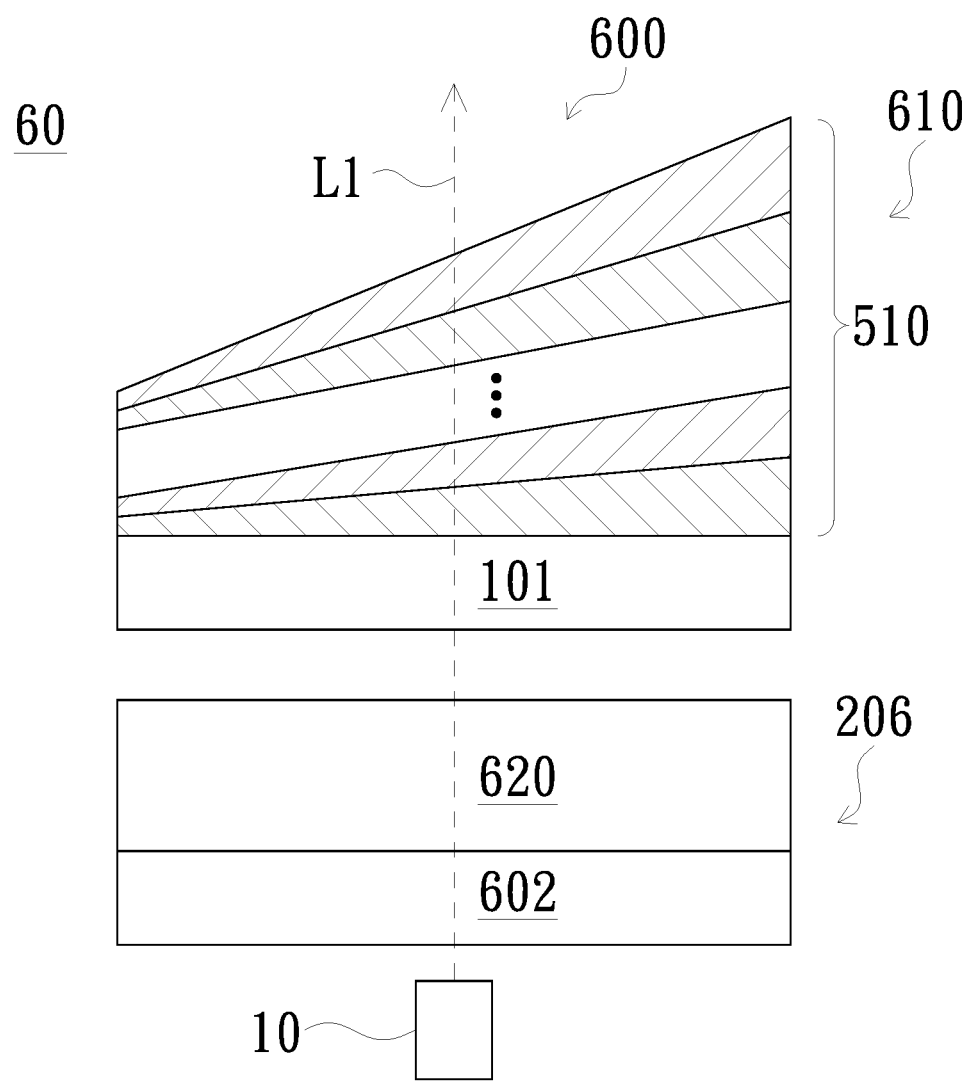
FIG. 6 is a cross-sectional view of a light source device in accordance with another embodiment of the present invention.

FIG. 6 is a cross-sectional view of a light source device 60 in accordance with an embodiment of the present invention, comprising an optical filtering assembly 600. The effect of the optical filtering assembly 600 is similar to that of the described embodiment. The optical filtering assembly 600 comprises a first interference filter and a second interference filter. Take FIG. 6 as an example, the first interference filter is an interference filter 610 and the second interference filter is an interference filter 206, wherein the interference filter 206 comprises a transparent substrate 602 and an interference film 620 formed on the transparent substrate 602. The interference film 620 may be any of the first interference film 110, the second interference film 120 and the third interference film 130 described. The transparent substrate 602 may be any of the first transparent substrate 101, the second transparent substrate 102 and the third transparent substrate 103 described. Therefore, the interference filter 206 may be any of the first interference filter 201, the second interference filter 202 and the third interference filter 203 described.

It can be seen that the interference filter 610 may be applied to the optical filtering assemblies 200a, 200b, 300, 400a, 400b, 400c in accordance with the described embodiments. In detail, in the embodiments with respect to FIGS. 2A-4C, any of the first interference filter 201, the second interference filter 202, 402 and the third interference filter 203 may be replaced by the interference filter 610. In addition, the optical filtering assembly 100 of FIG. 1A and the optical filtering assembly 500 of FIG. 5A may also comprise any of the first interference filter 201, the second interference filter 202, 402, the third interference filter 203 and the interference filter 610, so that each of the optical filtering assembly 100 of FIG. 1A and the optical filtering assembly 500 of FIG. 5A may comprise more than three layers of the interference films.

In sum, the at least two interference films of the optical filtering assembly in accordance with an embodiment of the present invention have a similar film layer structure which is able to produce different OPD, interference and light filtering improving effects. For example, when filtering a light beam, the optical filtering assembly provides the filtered light beam with a spectrum having a smoother strength distribution to reduce the influence caused by the ripples, which is helpful to the improvement of the precision and accuracy in measurements. The way producing the OPD may be achieved by making a difference of the coating film thicknesses between the two interference films, and/or by making a gradual change thickness between the two interference films, and/or by inserting an angle between the two interference films.

It is understood that the invention may be embodied in other forms within the scope of the claims. Thus, the present examples and embodiments are to be considered in all respects as illustrative, and not restrictive, of the invention defined by the claims.

What is claimed is:

1. An optical filtering assembly, comprising:
a first interference film comprising a plurality of first film layers and a plurality of second film layers, the plurality of first film layers and the plurality of second film layers being alternately stacked in the first interference film;
a second interference film comprising a plurality of third film layers and a plurality of fourth film layers, the plurality of third film layers and the plurality of fourth film layers being alternately stacked in the second interference film, wherein an optical constant of the plurality of first film layers is same as an optical constant of the plurality of third film layers, and an optical constant of the plurality of second film layers is same as an optical constant of the plurality of fourth film layers, the first interference film and the second interference film are both disposed in a transmission path of a light beam, and an optical path difference (OPD) of the light beam generated by travelling in the first interference film is different from an OPD of the light beam generated by travelling in the second interference film;
a first transparent substrate disposed in the transmission path of the light beam, wherein the first interference film is formed on the first transparent substrate in order to form a first interference filter; and
a second transparent substrate disposed in the transmission path of the light beam, wherein the second interference film is formed on the second transparent substrate in order to form a second interference filter;
wherein an angle between a normal of the first interference filter and the transmission path of the light beam is different from an angle between a normal of the second interference filter and the transmission path of the light beam;
wherein a first ripple effect is generated by allowing the light beam passing through the first interference film, and a second ripple effect is generated by allowing the light beam passing through the second interference film, the first ripple effect and the second ripple effect are offset with each other.

2. The optical filtering assembly as claimed in claim 1, wherein the first interference film comprises a first continuous film layer stack, and the second interference film comprises a second continuous film layer stack, the first continuous film layer stack is more than 30% of a total layer number of both of the plurality of first film layers and the plurality of second film layers in the first interference film, and the second continuous film layer stack is more than 30% of a total layer number of both of the plurality of third film layers and the plurality of fourth film layers in the second interference film, a ratio of a thickness of every first film layer and a thickness of every second film layer when the every first film layer and every second film layer are stacked in sequence in the first continuous film layer stack is equal to a ratio of a thickness of every third film layer and a thickness of every fourth film layer when the every third film layer and the every fourth film layer are stacked in sequence in the second continuous film layer stack.

3. The optical filtering assembly as claimed in claim 1, wherein a ratio of a thickness of every of the plurality of first film layers and a thickness of every of the plurality of second film layers when every of the plurality of first film layers and the every of the plurality of second film layers are stacked in sequence in the first interference film is equal to a ratio of a thickness of every of the plurality of third film layers and a thickness of every of the plurality of fourth film layers when the every of the plurality of third film layers and the every of the plurality of fourth film layers are stacked in sequence in the second interference film.

4. The optical filtering assembly as claimed in claim 1, wherein the first interference film and another second interference film are respectively formed at two opposite sides of the first transparent substrate, and the first interference film, the first transparent substrate and the another second interference film are all disposed in the transmission path of the light beam, a thickness of the first interference film is different from a thickness of the another second interference film.

5. The optical filtering assembly as claimed in claim 1, wherein the first interference filter is parallel to the second interference filter.

6. The optical filtering assembly as claimed in claim 1, further comprising:
a third interference filter disposed in the transmission path of the light beam, comprising:
a third transparent substrate; and
a third interference film formed on the third transparent substrate, and comprising a plurality of fifth film layers and a plurality of sixth film layers, the plurality of fifth film layers and the plurality of sixth film layers being alternately stacked in the third interference film, wherein an optical constant of the plurality of fifth film layers is same as the optical constant of the plurality of first film layers, and an optical constant of the plurality of sixth film layers is same as an optical constant of the plurality of second film layers, the third interference film is disposed in the transmission path of the light beam, and an optical path difference (OPD) of the light beam generated by travelling in the third interference film is different from the OPD of the light beam generated by travelling in the first interference film or the second interference film.

7. The optical filtering assembly as claimed in claim 1, wherein the first interference film comprises a first side and a second side opposite to the first side, a thickness of the first interference film is gradually decreased from the first side to the second side.

8. The optical filtering assembly as claimed in claim 1, wherein the plurality of first film layers and the plurality of second film layers are formed in situ, and the plurality of third film layers and the plurality of fourth film layers are formed in situ.

9. The optical filtering assembly as claimed in claim 1, wherein the first interference film and the second interference film are formed in situ.

10. The optical filtering assembly as claimed in claim 1, wherein the first ripple effect and the second ripple effect are offset with each other within a preset waveband.

11. The optical filtering assembly as claimed in claim 1, wherein the first interference filter is neither parallel to nor perpendicular to the second interference filter.

12. The optical filtering assembly as claimed in claim 11, wherein a thickness of the first interference filter is equal to a thickness of the second interference filter.

13. A light source device, comprising:
a light source emitting a light beam;
an optical filtering assembly as claimed in claim 1, disposed in a transmission path of the light beam.

14. The light source device as claimed in claim 13, wherein the first interference film comprises a first continuous film layer stack, and the second interference film comprises a second continuous film layer stack, the first continuous film layer stack is more than 30% of a total layer number of both of the plurality of first film layers and the plurality of second film layers in the first interference film, and the second continuous film layer stack is more than 30% of a total layer number of both of the plurality of third film layers and the plurality of fourth film layers in the second interference film, a ratio of a thickness of every first film layer and a thickness of every second film layer when the every first film layer and every second film layer are stacked in sequence in the first continuous film layer stack is equal to a ratio of a thickness of every third film layer and a thickness of every fourth film layer when the every third film layer and the every fourth film layer are stacked in sequence in the second continuous film layer stack.

15. An optical filtering assembly, comprising:
a first interference film comprising a plurality of film layers which have a first thickness distribution;
a second interference film comprising a plurality of film layers which have a second thickness distribution, wherein the plurality of film layers of the first thickness distribution of the first interference film based on a preset sequence and the plurality of film layers of the second thickness distribution of the second interference film based on the preset sequence have a ratio of thickness, the ratio of thickness is a constant, the first interference film and the second interference film are both disposed in a transmission path of a light beam, and an optical path difference (OPD) of the light beam generated by travelling in the first interference film is different from an OPD of the light beam generated by travelling in the second interference film;
a first transparent substrate disposed in the transmission path of the light beam, wherein the first interference film is formed on the first transparent substrate to form a first interference filter piece; and
a second transparent substrate disposed in the transmission path of the light beam, wherein the second interference film is formed on the second transparent substrate to form a second interference filter piece;
wherein an angle between a normal of the first interference filter piece and the transmission path of the light beam is different from an angle between a normal of the second interference filter piece and the transmission path of the light beam;
wherein a first ripple effect is generated by allowing the light beam passing through the first interference film, and a second ripple effect is generated by allowing the light beam passing through the second interference film, the first ripple effect and the second ripple effect are offset with each other.

16. The optical filtering assembly as claimed in claim 15, wherein the first interference filter piece and the second interference filter piece are neither parallel to nor perpendicular to each other, and the constant is 1.

17. The optical filtering assembly as claimed in claim 15, wherein the constant is not 1.

18. The optical filtering assembly as claimed in claim 15, wherein the first interference film comprises a first continuous film layer stack, and the second interference film comprises a second continuous film layer stack, the first continuous film layer stack is more than 30% of a total layer number of both of the plurality of first film layers and the plurality of second film layers in the first interference film, and the second continuous film layer stack is more than 30% of a total layer number of both of the plurality of third film layers and the plurality of fourth film layers in the second interference film, a ratio of a thickness of every first film layer and a thickness of every second film layer when the every first film layer and every second film layer are stacked in sequence in the first continuous film layer stack is equal to a ratio of a thickness of every third film layer and a thickness of every fourth film layer when the every third film layer and the every fourth film layer are stacked in sequence in the second continuous film layer stack.

19. The optical filtering assembly as claimed in claim 15, wherein the first interference film and the second interference film are formed in situ.

20. The optical filtering assembly as claimed in claim 15, wherein the first ripple effect and the second ripple effect are offset with each other within a preset waveband.

* * * * *